United States Patent
Cheng et al.

(10) Patent No.: US 6,404,506 B1
(45) Date of Patent: Jun. 11, 2002

(54) NON-INTRUSIVE LASER-BASED SYSTEM FOR DETECTING OBJECTS MOVING ACROSS A PLANAR SURFACE

(75) Inventors: Harry H. Cheng, Davis; Benjamin D. Shaw, Vacaville; Joe Palen, Davis; Jonathan E. Larson, Davis; Xudong Hu, Davis; Kirk Van Katwyk, Tracy, all of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/264,828

(22) Filed: Mar. 8, 1999

Related U.S. Application Data

(60) Provisional application No. 60/077,360, filed on Mar. 9, 1998.

(51) Int. Cl.$^7$ ................................................. G01B 11/02
(52) U.S. Cl. ..................... 356/634; 356/635; 356/636; 356/614; 356/615; 250/559.22; 250/559.26
(58) Field of Search .................. 356/383, 384, 356/385, 386, 387, 376, 285, 614, 615, 628, 634, 635, 639, 640; 250/559.22, 559.26, 559.24, 216, 208.2, 206; 348/149; 340/942, 934

(56) References Cited

U.S. PATENT DOCUMENTS

| | | | | |
|---|---|---|---|---|
| 3,436,540 A | * | 4/1969 | Lamorlette | 250/216 |
| 3,532,886 A | * | 10/1970 | Kruger, Jr. et al. | 356/383 |
| 3,897,156 A | * | 7/1975 | Chasson | 356/383 |
| 3,967,111 A | * | 6/1976 | Brown | 250/206 |
| 4,214,265 A | * | 7/1980 | Olessen | 348/149 |
| 4,258,351 A | * | 3/1981 | Shigeta et al. | 250/208.2 |
| 5,241,315 A | * | 8/1993 | Spinhirne | 356/28.5 |
| 5,321,490 A | | 6/1994 | Olson et al. | |
| 5,537,110 A | * | 7/1996 | Iida et al. | 340/942 |

(List continued on next page.)

FOREIGN PATENT DOCUMENTS

GB  2231952  * 11/1990

OTHER PUBLICATIONS

Tyburski, R.M., A Review of Road Sensor Technology for Monitoring Vehicle Traffic, ITE Journal, vol. 59, No. 8, pp. 27–29, Aug. 1989.

Palen, J., The Need for Surveillance in Intelligent Transportation Systems, Intellimotion, vol. 6, No. 1, pp. 1–3 and 10, 1997.

(List continued on next page.)

Primary Examiner—Robert H. Kim
Assistant Examiner—Sang H. Nguyen
(74) Attorney, Agent, or Firm—John P. O'Banion

(57) ABSTRACT

In current practice, quantitative traffic data is most commonly acquired from inductive loops. In addition, video-image processing or time-of-flight laser systems can be used. These methods all have problems associated with them. Therefore, we have developed a new type of non-intrusive laser-based detection system for measurement of vehicle travel time. The system employs a fan angle laser, an image lens, a set of cylindrical optics, a linear photodetector array, and associated signal processing hardware and software. The system is positioned above the plane of detection and configured such that it can unambiguously find the object boundaries in all lighting conditions independent of the time-of-flight of the laser. Instead of depending upon the reflectance of the object being detected, or determination of the range or distance from the detector to the object being detected, the invention reflects the laser off of the pavement or other roadway surface. The lack of a reflection determines the size, shape, and "presence" of the vehicle, and the system is capable of determining the length and width of moving objects, as well as travel time, in real time with high resolution.

24 Claims, 13 Drawing Sheets

U.S. PATENT DOCUMENTS

| | | | |
|---|---|---|---|
| 5,546,188 A | | 8/1996 | Wangler et al. |
| 5,752,215 A | * | 5/1998 | Zaaiman et al. ............ 340/942 |
| 5,757,472 A | | 5/1998 | Wangler et al. |
| 5,764,163 A | * | 6/1998 | Waldman et al. ........... 340/934 |
| 5,793,491 A | | 8/1998 | Wangler et al. |
| 5,943,476 A | * | 8/1999 | Dougherty et al. ........... 359/94 |

OTHER PUBLICATIONS

Palen, J., The Need for Surveillance in Intelligent Transportation Systems—Part Two, Intellimotion, vol. 6, No. 2, pp. 1–3 and 17, 1997.

Halverson et al., Automated Real–Time Dimension Measurement of Moving Vehicles Using Laser Rangefinders, Masters Thesis, University of Victoria, Department of Mechanical Engineering, pp. 1–117, 1995.

Hussein, Tarik Mustafa, Infrared Vehicle Sensor for Traffic Control (1994), Ph.D. dissertation, City University of New York.

Hussain, Tarek M., Baig, M., Saadawi, Tarek N., Ahmed, Samir A.; "INFRARED PYROELECTRIC SENSOR FOR DETECTION OF VEHICULAR TRAFFICE USING DIGITAL SIGNAL PROCESSING TECHNIQUES," IEEE Transactions on Vehicular Technology, vol. 44, No. 3, pp. 683–689, Aug. 1995.

Hussain, Tarek M.; "USING SIGNAL–TO–NOISE RATIO AS EVIDENCE TO DETECT PRESENCE–ABSENCE OF VEHICLES," ITE Journal, pp. 46–51, Jul., 1995.

Hussain, Tarek M., Saadawi, Tarek N. and Ahmed, Samir A.; "OVERHEAD INFRARED VEHICLE SENSOR FOR TRAFFICE CONTROL," ITE Journal, pp. 38–45, Sep., 1993.

Hussain, T.M.; "USING INFRARED TO SEE THROUGH THE TRAFFIC JAM," Electronics World, pp. 10, Jan., 1996.

Emerson, Lawrence; "MOBILE VIDEO SURVEILLANCE AND RAMP–METERING," Intellimotion, vol. 6, No. 2, pp. 10–12, (1997).

MacCarley, C. Arthur; "ADVANCED IMAGING TECHNIQUES FOR TRAFFIC SURVEILLANCE AND HAZARD DETECTION," Intellimotion, vol. 6, No. 2, pp. 6–9 and pp. 14–15, (1997).

Ostland, Michael et al.; "SIMPLE TRAVEL TIME ESTIMATION FROM SINGLE–TRAP LOOP DETECTORS, "Intellimotion, vol. 6, No. 1, pp. 4–5 and pp. 11, (1997).

Lin, Bin et al.; "OPTICAL AND ELECTRONIC DESIGN FOR A FIELD PROTOTYPE OF A LASER–BASED VEHICLE DELINEATION DETECTION SYSTEM," Submitted to Lasers and Optics Engineering, pp. 1 thru 17, Dec., 2000.

Cheng, Harry H. et al.; "A REAL–TIME LASER–BASED PROTOTYPE DETECTION SYSTEM FOR MEASUREMENT OF DELINATIONS OF MOVING VEHICLES," California PATH Working Paper, UCB–ITS–PWP–98–20, California PATH Program, Institute of Transportation Studies, University of California, Berkeley, pp. 1–29, Sep. 1998.

Malik, Jitendra, Russell, Stuart; "MEASURING TRAFFIC PARAMETERS USING VIDEO IMAGE PROCESSING," Intellimotion, vol. 6, No. 1, pp. 6–7 and pp. 11–13, (1997).

* cited by examiner

NON-INTRUSIVE LASER-BASED SYSTEM FOR DETECTING OBJECTS MOVING ACROSS A PLANAR SURFACE

This application claims benefit of Provisional appln. No. 60/077,360 filed Mar. 9, 1998.

BACKGROUND OF THE INVENTION

1. Field of the Invention

This invention pertains generally to laser-based systems for detecting objects moving across a planar surface, and more particularly to a non-intrusive laser-based detection system for determining vehicle travel time which is positioned above the plane of detection and configured such that it can unambiguously find the object boundaries in all lighting conditions independent of the time-of-flight of the laser.

2. Description of the Background Art

Travel time is the most important aspect of the Intelligent Transportation System (ITS). For example, travel time is a good indicator of other direct constraints on ITS efficiency, such as cost, risk, and attentive workload. The importance of travel time has been verified in ATIS user surveys which indicate that what travelers most want from a transportation system is (almost always) reduced travel time and higher reliability [15]. Every traveler must implicitly or explicitly make an assessment of these various travel time options before embarking on every trip; therefore, this information is definitely of high value. Because trip travel time is the parameter the public most wants to minimize, this is the parameter that is most important for transportation service providers to measure and minimize.

Speed is commonly used as an indicator of the travel time across a link. In current practice, speed is measured at one or more points along a link and extrapolated across the rest of the link [14]. This extrapolation method is used regardless of the mechanism of detection. Examples of detection methods include loops-which determine speed from two elements twenty feet apart [8]; radar, which can directly determine speed from the carrier frequency shift (Doppler effect); and video image processing, which tracks vehicles across the pixel elements within the field of view [9][10]. The extrapolation from a point to a line, however, is not necessarily valid. At the onset of flow breakdown, the speed variations along the length of a link can be quite large. Also, the onset of flow breakdown occurs when routing decisions are most time-critical and accurate information has the highest value, so inaccurate extrapolations could have detrimental effects to the traveler.

An alternate method to determine the traverse travel time (e.g. the true link speed) is to use Vehicles As Probes (VAP). A VAP system determines travel time directly by identifying vehicles at the start of the link and re-identifying them at the end of the link, with the time difference being the true travel time. The problem with VAP systems, however, is that they require large numbers of both vehicle tags and tag readers to be effective, and the cost justification of such a system may be unwarranted in the light of other options. The key aspect to measuring the actual travel time is simply to identify some distinguishing characteristic of a vehicle at the beginning of a link and then to re-identify that same characteristic on the same vehicle at the end of the link. This is the basic idea of VAP; however the characteristic does not have to be entirely unique (as in a vehicle tag), and it does not necessitate the infrastructure set-up costs of VAP [13].

As an alternative to VAPs, if a characteristic can be found to separate the fleet into, for example, 100 classifications, the "maximum probability fit" can be determined for the same sequence of classifications at the downstream detector as was identified at the upstream detector [2]. This is what is currently being done in Germany with the low-resolution imaging provided by new high-speed loops [12], and has been demonstrated in California. If a higher-resolution detector is used so that it is possible to get a few thousand classes, then it is theoretically possible to perform 100% upstream-downstream Origin and Destination (O/D) identification using time gating and other relatively straightforward signal processing techniques (even if a significant percentage of the vehicles switch lanes). The mechanism of detection must allow highly resolved delineation between commonly available "commuter" vehicles, because commuter vehicles represent the majority of the vehicle stream during the period that traverse travel time information is most needed (e.g. the peak hours).

It is recognized that any mechanism to measure travel time, by definition, is only determining the "past state" of the transportation system. Collecting data on what happened in the past, however, has no utility unless it is used to infer what may happen in the future. Therefore, all decisions by definition are based on an inference of future consequences. For example, when a traveler learns that speed on a route is 50 MPH, the traveler generally infers that the speed will remain 50 MPH when he or she traverses it. This may or may not be a reasonable inference. Travelers want to know the "state" of the system in the future when they traverse it. In the simplest case, this is just a straight extrapolation of current "state." More sophisticated travelers may develop their own internal conceptual model of the typical build up and progression of congestion along routes with which they are familiar. A major benefit of ITS will be to provide travelers with a much more valid and comprehensive "look ahead" model of the short term) future state of the transportation system.

In current practice, vehicle features are most commonly measured using inductive loops or video image processing. Because loops are buried beneath the pavement, installation requires heavy equipment, and traffic must be re-routed [19]. It is for this reason that loops are expensive to install and repair. More importantly, loop detectors cannot be relied upon to produce accurate speed (and therefore length) measurements because the inductive properties of the loop and loop detectors vary [19]. Video can be used to directly measure the length of vehicles, but the use of real time video image processing is problematic due to its computationally intensive nature. However, because video is a passive system (gathering ambient light), video images are dependent on the lighting conditions. Vehicle length measurements taken from video, even on the game vehicle, may not produce consistent results depending on time of day and weather conditions. For truly site and time independent vehicle length measurements, video would require an external source of illumination.

One system that addresses some of these problems is the Automatic Vehicle Dimension Measurement System (AVDMS) developed by the University of Victoria [4]. The AVDMS uses laser time of flight data to classify vehicles based on length, width, or height, and is based on the Schwartz Electro-Optics Autosense III sensor [7][20][21][22]. The Schwartz systems are entirely dependent on time-of-flight laser measurements with moving parts, similar to conventional LIDAR. In addition, the fundamental mechanism of detection is that the Schwartz detector determines the range (or distance) from the detector to the objects being detected. Furthermore, the laser of the Schwartz detector reflects off the vehicle to determine the size, shape, and "presence" of the vehicle.

In view of the foregoing, there is a need for a system that is easier to install and maintain than loop detectors, and which is mounted above the road so that, once installed, it can be maintained without disrupting the flow of traffic. There is a further need for a system that operates on a simple "on/off" basis, requiring much less computation for vehicle detection, and consequently much less computational hardware. While systems are known where the detectors are mounted above the road, such as in a Schwartz system, there is a further need for a system which does not operate on time-of-flight because time-of-flight systems are complex and susceptible to errors introduced by, for example, ambient temperature differentials. A further need exists for a detector that does not determine the range or distance from the detector to the objects being detected, or which reflects off the vehicle to determine the size, shape, and "presence" of the vehicle. The present invention satisfies those needs, as well as others, and overcomes the deficiencies and complexity found in conventional detection systems.

BRIEF SUMMARY OF THE INVENTION

The present invention generally comprises a non-intrusive laser-based system for detecting objects moving across a planar surface. The system is positioned above the plane of detection and configured such that it can unambiguously find the object boundaries in all lighting conditions independent of the time-of-flight of the laser. Unlike conventional overhead mounted detectors using time-of-flight information, the present invention does not depend on reflectance from the object being detected. Nor does the present invention determine the range or distance from the detector to the object being detected. In contrast, the present invention reflects the laser off of the pavement or other roadway surface, and the lack of a reflection determines the size, shape, and "presence" of the vehicle. The present invention is able to determine the length and width of moving objects in real time with high resolution. This information can then be used to differentiate similar objects, as well as subsequent re-identification of individual objects or object groups, providing a real measure of travel time between detection sites. And, unlike conventional systems, no moving parts are required.

By way of example, and not of limitation, the basic detector unit comprises a laser and a spatially offset photodetector positioned above the plane of detection. The laser is a pulsed infrared diode laser which uses line generating optics to project a beam on a flat planar surface where objects are to be detected. The photodetector portion comprises imaging optics and a linear photodetector array. The laser projects a beam toward the planar surface at an angle that is offset from a line perpendicular to the plane of the surface, and the photodetector array has a field of view which is substantially perpendicular to the surface. In other words, the plane of the beam from the laser is offset from the plane of the field of view of the photodetector. The elements of the photodiode array receive, in parallel, laser light that is reflected back from the plane of detection, and absence of reflected light is used to infer the presence of an object under the detector unit. Two of these units are integrated and placed a known distance apart.

It will be appreciated that validation of any traffic model requires, either implicitly or explicitly, traffic origin/ destination (O/D) data. The lack of valid O/D data has been the major impediment in the calibration, validation, and usage of traffic models. This has led to the major motivation of this invention; namely, to develop a roadway detection system that can directly determine travel time and O/D data non-intrusively without violating the public's privacy, as in license plate recognition systems.

The present invention has a number of objects and advantages over other systems currently in use. In current practice, vehicle features are most commonly measured using inductive loops or video image processing. An advantage of our system over loop detectors is the relative ease of installation and maintenance. Because loops are buried beneath the pavement, installation requires heavy equipment, and traffic must be re-routed [19]. It is for this reason that loops are expensive to install and repair. Because our system is mounted above the road, once installed, it can be maintained without disrupting the flow of traffic. More importantly, loop detectors cannot be relied upon to produce accurate speed and resultant length measurements because the inductive properties of the loop and loop detectors vary [19]. While video can be used to directly measure the length of vehicles, the use of real time video image processing is problematic due to its computationally intensive nature. Our system operates on a simple "on/off" basis, requiring much less computation for vehicle detection, and consequently much less computational hardware. Also, because video is passive system (gathering ambient light), video images are dependent on the lighting conditions. Vehicle length measurements taken from video, even on the same vehicle, may not produce consistent results depending on time of day and weather conditions. For truly site and time independent vehicle length measurements, video would require an external source of illumination. Because our system employs a laser and, therefore, is active, it produces its own signals to be sensed and it done not suffer from these limitations. The current laser-based systems rely on the time-of-flight of the laser and reflectance of the laser off of the object being detected. Those systems also rely on a scanning system that employs moving mirrors or other optics to cover the field of view However, the computational complexity of using time-of-flight data, susceptibility to errors resulting from temperature changes, and use of moving parts, makes such systems expensive and difficult to maintain.

In comparison with conventional traffic detection techniques, our invention offers the following salient features:

The system is mounted above the road and is relatively easy to install. Traffic need not be rerouted.

The system is insensitive to ambient lighting conditions due to use of a laser as an active lighting source that can detect every passing object more than 1.5 foot tall in all lighting conditions. No vehicles are missed, yielding 100% accuracy.

The laser and detector have no moving parts, giving the system high reliability.

The primary raw data gathered by the sensor are computationally easy to process.

Not only does the detector produce local vehicle speed, vehicle volume, and vehicle classifications, but it allows 6 highly deterministic re-identification of vehicles between sites, even under high flow conditions. Point-to-point travel time, incident detection, and Origin/Destination data can easily be determined with this detector.

The system has very low power and communication bandwidth requirements, allowing the development of a stand-alone detector untethered from hard-wired infrastructure.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
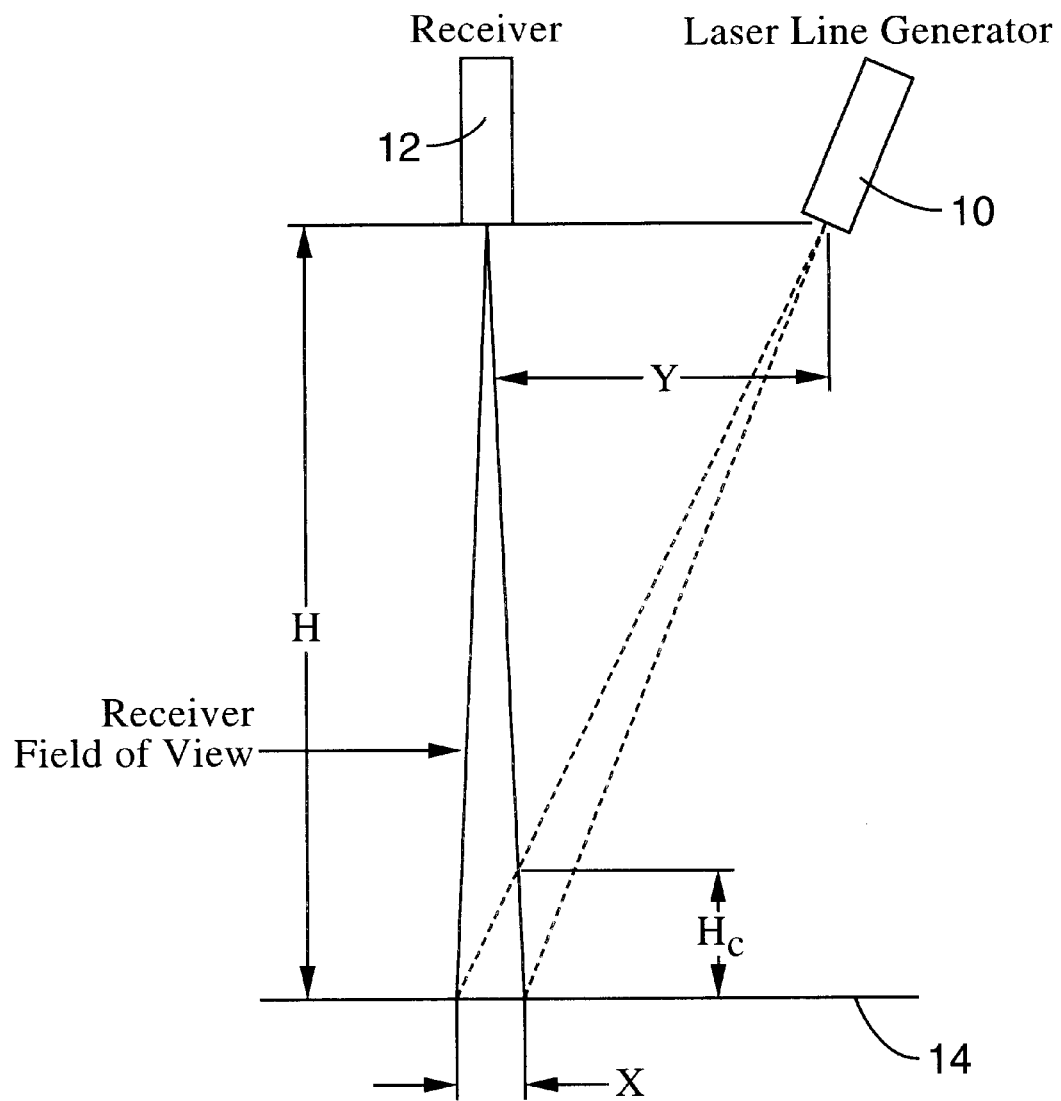
FIG. 1 is a side schematic view of a laser-based detector configuration according to the invention.

Referring more specifically to the drawings, for illustrative purposes the present invention is embodied in the apparatus and method generally shown and described with reference to FIG. 1 through FIG. 17. It will be appreciated that the apparatus may vary as to configuration and as to details of the parts, and that the method may vary as to the specific steps and sequence, without departing from the basic concepts as disclosed herein.

A. Methodology

1. Functional Requirement of Non-intrusive Detection System

If the primary purpose of a roadway detection system is redefined "to acquire unique or semi-unique information on vehicles and then re-identify them downstream", then the functional requirements of this type of system can be determined. Using this definition, the system should be of high enough resolution to delineate the vehicles, he reproducible enough to re-identify the vehicles with site independence, and be inexpensively deployable.

(a) Resolution

For humans, resolving an image down so that it can be identified and re-identified is a relatively simple task; we have had a few billion years to perfect the technique. From a detection and information processing perspective, however, the task is not nearly as simple. For example, a video image processing system would have to identify each of many moving "blobs", scan each blob, segment it into parts (hood, door, tires, etc.), and integrate the segments into an (inferred) class, make or model, and store this information in a reproducible format which could be used for re-identification. This is computationally an extremely expensive task that would tax the capabilities of the most powerful computer available today. An optimized roadway base detector system should use the basic properties of the roadway to its advantage. Vehicles on a roadway lane almost always travel in one direction; namely, in the longitudinal direction. Therefore, there is no reason for the detector to scan in the longitudinal direction; it can simply have a number of quick, but temporally offset, samples at a fixed place in the road to acquire longitudinal delineation. Vehicles can also be laterally anywhere in a lane. Therefore, a detector needs to acquire information across almost the full width of a lane. Information acquired from any specific lateral orientation will be a function of the vehicles lateral position in the lane. Because vehicles tend to be more-or-less laterally symmetrical, it would be optimal for an overhead detector to integrate the information across the lateral direction and differentiate the information in the longitudinal direction to acquire the needed resolution for vehicle classification delineation.

(b) Reproducibility

To be reproducible, the detector should be active; that is, the detector should transmit its own energy that reflects off the vehicles in the same way every time. The information acquired from passive detectors, which depend on light, heat or sound, varies with sun angle, trip distance, and speed and, therefore, is not reproducible. On the other hand, the receiver of an active detector must be able to differentiate the active reflected energy from the natural background ambient energy in the same spectrum. This may be accomplished in a number of ways. For example, the detector transmitter may produce a very high power burst for a very small time period (often measured in nanoseconds) that oversaturates the background. Or, the transmitter may transmit energy only over a very narrow spectrum and the receiver filters out all energy except that spectrum (such extreme narrow band filters can be expensive). Furthermore, the transmitter may modulate energy at a high frequency and the AG output of the receiver be filtered to remove components below that frequency. In practice, all three methods may be used in the most economical combination. Length can be directly measured through an array processing systems (e.g. video), but this is generally noisy and inaccurate. It can also be determined from the vehicle's instantaneous speed and residence time in the detection zone. Instantaneous speed can be directly acquired from the Doppler phase shifting of the energy transmitted from the detector and reflected off the vehicle, but this requires a relatively acute angle, which means the vehicle must be away from the detector where it would be difficult to acquire the needed delineating information with high resolution. Therefore, the instantaneous speed is most optimally acquired by precisely timing when the vehicle passes two adjacent detection zones a known distance apart. The tighter the timing and longitudinal resolution, the more precisely speed (and therefore length) can be determined. To be reproducible, an deal detector would produce the same information independent of the view angle. However, the effective energy backscattered from an active detector is always contingent on the vehicle's perceived cross section which changes with the view angle from the detector. The only parameters that can be reproducibly derived from any line-of-sight view angle orthogonal to the vehicle's velocity vector are its (longitudinal) length and its color.

(c) Deployability

Intrusive detectors that are embedded in the pavement are quite costly to install and maintain because the traffic must be moved out of the way to gain access. For any non-intrusive detector to work, it must have line-of-sight to the vehicles. This requires that it be mounted up high enough to obtain an unoccluded view of all lanes. Because overhead structures are not always available at the most needed places for detection, a detector that can be side mounted would be much more deployable. Detection systems that require high precision thermally stable electronics, such as time-of-flight or Doppler phase shifting systems) can be costly, complex, difficult to calibrate, and difficult to maintain. Systems based on a low number of simple, cheap, commonly available electronic components are desirable. Systems that have no mechanical moving parts generally require less maintenance. Computational complexity tends to increase with the number of detection elements and amount of noise per element. Video image processing systems analyze millions of relatively noisy pixels per second, and therefore tend to be computationally (and financially) expensive. Systems where the computational overhead can be handled by simple low cost CPUs are desirable. The fiscal and administrative costs of running hard-wired cable to a detection site is often the single most significant limiting factor for deployment. Running cable may require: traffic control, laying down K-rail, trenching, letting a minor contract, and budgeting many years in advance. A self-contained detection system that could be powered by photovoltaics and communicate through (non-FCC constrained) RF would greatly enhance deployability. This self-powered self-communicating capability has been what has made call-boxes so popular.

2. Vehicle Delineating Parameters

Of all the existing means of detection, loops, magnetometers, piezos, and tubes are intrusive. Acoustic is low resolution and subject to nonlinearity with thermal effects. Passive IR is low resolution and subject to nonlinearity with changes in ambient temperature. Doppler Radar lacks resolution and only works well at acute angles. Pulsed microwave backscatter produces a non-reproducible reflectance as a function of beam angle. Scanning laser time-of-flight systems are costly and have moving parts. What are we left with? Something that currently doesn't exist; namely, a simple laser backscatter system combined with a robust "maximum probability fit" classification sequencing algorithm. Lasers produce a tightly focused coherent beam of EM radiation at various frequencies. Spectral filters and/or modulation techniques can be used to discriminate the backscattered beam from the ambient background. The existing roadway based laser detection systems use the time-of-flight of a pulsed laser beam to determine the distance between the object and detector, but these systems require high precision electronics, which are quite expensive. All that is really needed for detection is to determine "if the laser is backscattering off the pavement" or "if it is reflecting off something else". It can be assumed that "something else" is a vehicle. Using the laser, the following delineating parameters of a vehicle could be detected non-intrusively [15].

(a) Reflectance Signature

The reflectance signature of a vehicle has the potential to be a highly delineating vehicle parameter. However, analogous to video image processing systems (VIPS), the high information density of a reflectance signature would be difficult to process into a reproducible parameter. Although laser reflectance signal processing would (most probably) be easier than that required for VIPS due to the controlled spectrum and consistent source-vehicle-detector geometrics, one might expect very high reflectance outlines when parts of the vehicle body are exactly orthogonal to the transmitting laser is vector. These would tend to oversaturate the photo-diode detector. Therefore, this system would probably require multiple parallel lateral optical paths to reduce the effects of these outlines on the signature, with each path requiring a wide dynamic range high speed A/D converter. An advantage of this method is that the laser and return detector could be in the same optical path so that site specific focusing would not be necessary and fabrication would be (relatively) easy. A major disadvantage would be the high bandwidth signal processing and/or communication needed.

(b) Length

The length of a vehicle cannot easily be measured directly. In accordance with the present invention, however, vehicle length can be calculated from the speed and residence time under the detector, both of which are ascertained simply from vehicle "presence". Referring to FIG. 1, a laser line generator 10 and associated receiver 12 are shown mounted at a height H above a roadway surface 14. Vehicle "presence" can be measured with divergent optical paths as shown in FIG. 1, allowing use of inexpensive high-speed digital samplers. From FIG. 1 we can determine the laser-receiver separation distance Y as function of height H as follows:

$$Y = \frac{X(H - H_c)}{H_c} \quad (1)$$

where X is the width of the field of view of the receiver 12 at the roadway surface 14, and Hc is the minimum object height. Divergent optical paths will require some focusing, making fabrication and calibration slightly more difficult. Inherently, all other spacially oriented vehicle delineating parameters will have to be normalized by vehicle length to assure a consistent record format. It is not a question of "if" length should be measured, it is a question of "how accurate". Length alone would appear to be a highly delineating parameter for passenger vehicles if measured with sufficient precision. The signal processing and communication requirements for length are smaller than for any other parameter.

(b) Overhead Profile

An inherent problem with the measurement of vehicle length is that many, if not most, passenger vehicles have some curvature to their bumpers. Only the maximum vehicle length, usually along the lateral center-line of the vehicle, is reproducible. Because the vehicle may be anywhere within or between lanes, measurements need to be made across the full lane width to assure capture of the vehicle lateral center line and therefore the maximum vehicle length. This will also provide the shape factor of the bumpers and vehicle width, which are additional delineating parameters.

(c) Color

It is expected that the reflectance ratios of two different frequency lasers in the IR spectrum will be a function of the vehicle color and, therefore, provide a consistent metric independent of orientation. This requires analog sampling, but at a relatively low rate. If multiple samples are taken, the differential reflectance values for the non-colored items, such as bumpers, windshield, etc., can be easily rejected by making a histogram of the ratio values. The "mode" should represent the largest surface area of the vehicle (which is colored). This represents relatively simple signal processing.

B. System Overview

Figure 2:
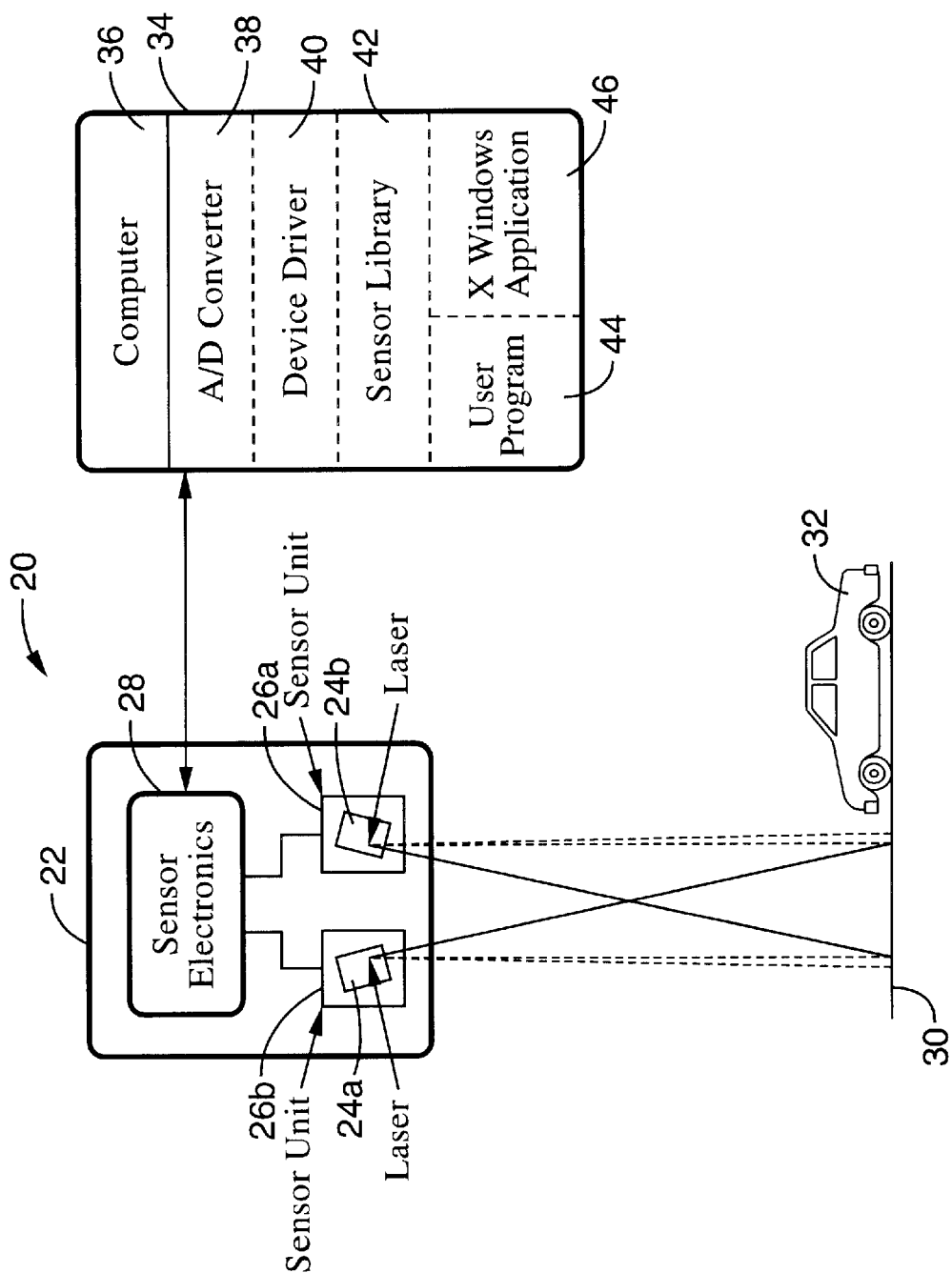
FIG. 2 is a side diagrammatic view of a two detector laser-based detector system according to the invention.

Referring to FIG. 2, a preferred embodiment of a laser-based detector system 20 in accordance with the present invention is generally shown. The system includes a detector unit 22, comprising two lasers 24a, 24b, two sensors 26a, 26b and associated electronic circuitry 28, which is positioned above the roadway surface 30 to detect the length of a vehicle 32 moving in a longitudinal direction. Each laser and associated sensor constitutes a laser-based detector. In our system, vehicle length is used as the primary identifying feature and is measured using two laser-based detectors. Note that Sensor 26a detects signals from laser 24a, while sensor 26b detects signals from laser 24b. In other words, the field of view of a laser and associated sensor are in different planes, rather than in the same place. The system also includes a signal processing system 34, generally comprising a computer 36, a multichannel analog to digital converter (ADC) 38, device drivers 40, a sensor library 42, user program 44 and X Windows applications 46, as will be discussed in more detail below.

The system operates in the following manner, as is illustrated in FIG. 2. At explained above, each detector unit comprises a laser and a spatially offset photodetector positioned above the plane of detection. The laser is preferably a pulsed infrared diode laser that utilizes line-generating optics to project on a flat planar surface where objects are to be detected. The detector preferably comprises imaging optics and a linear photodiode array. The offset photodiode array receives the laser light that is reflected back from the plane of detection. The signal from the photodiode array is amplified and sent to the signal processing system for processing. Vehicle presence is detected based on the absence of reflected laser light, which is used to infer the presence of an object under the detector unit. Two detector units are integrated and placed a known distance apart, allowing the velocity of the object and its residence time under each detector to be measured, and giving the object's length and top-down outline profile.

C. System Components

Figure 3:
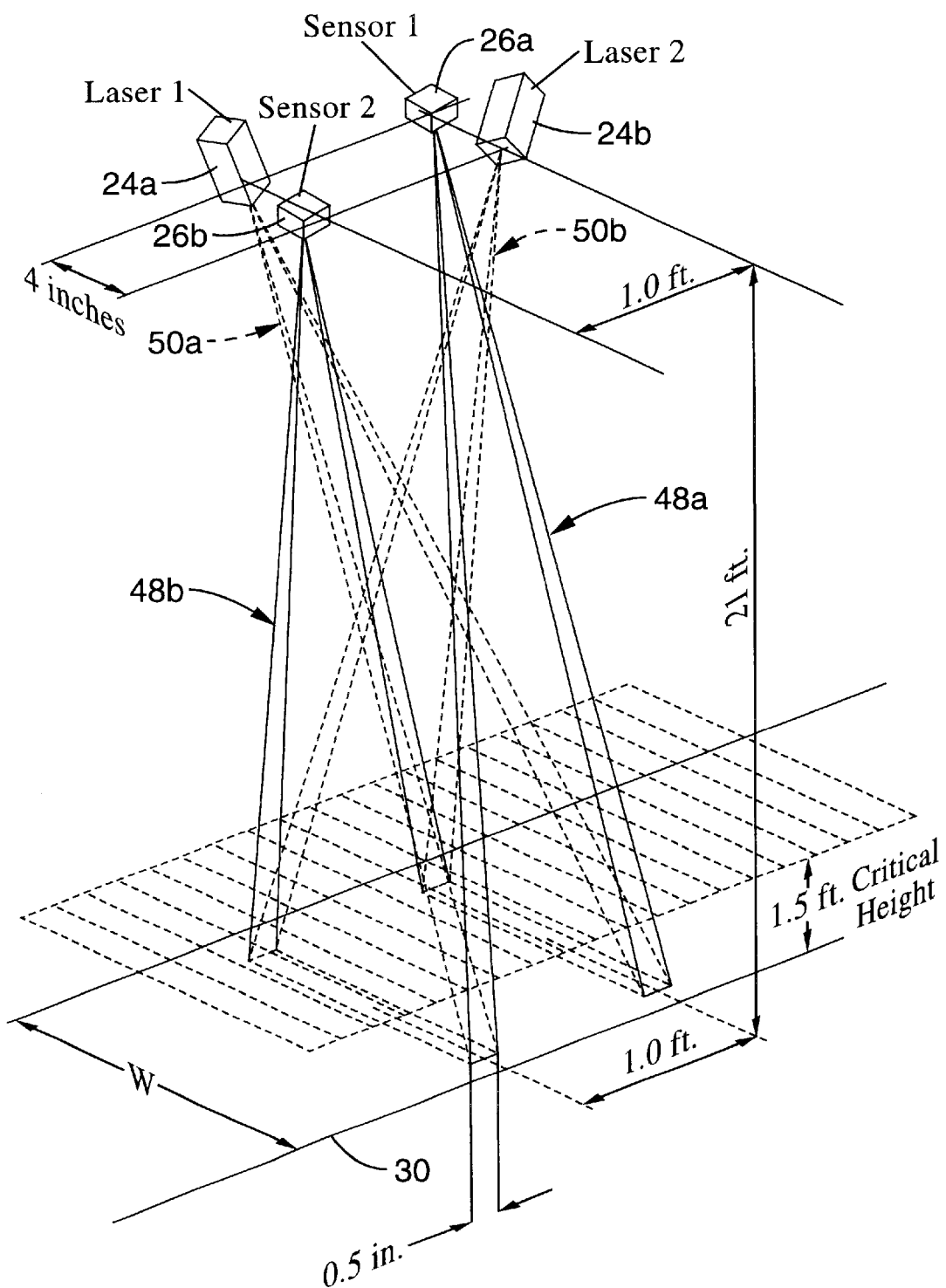
FIG. 3 is a perspective diagrammatic view of the detector configuration in the system shown in FIG. 2.

Referring also to FIG. 3, the preferred positioning of the detector system hardware can be seen. Note that signal processing system 34 is not shown in FIG. 3, because the preferred positioning of signal processing system 34 is remote from the detector hardware. The most practical manner of interconnecting the detector system hardware and signal processing system hardware is through conventional cabling, although it will be appreciated that radio frequency or optical telemetry links or the like could be employed as an alternative interconnection technology.

As shown in FIG. 3, the detector units comprising the lasers and sensors are carried by a frame or enclosure and mounted at a distance of about twenty-one feet above the roadway surface 30, which is the height of a typical highway overpass. The equipment can be mounted beneath or preferably on the side of the highway overpass, or on an alternative support structure. The longitudinal distance between each component of a laser/sensor pair is approximately one foot. The lateral offset between the two sensor pairs is approximately four inches. The sensors are mounted in a fixed vertical position, pointing downward, and are focused on the ground, forming two detection zones for reflected light, or fields of view, 48a, 48b which are depicted by the solid lines in FIG. 3. The lasers, the beams 50a, 50b of which are depicted in broken lines in FIG. 3, are pointed towards the detection zones and are mounted at an adjustable angle, allowing the system to be mounted at different heights. The fields of view 48a, 48b stretch across the width W of the lane and are each about 0.5 inches wide in the direction of traffic flow. In this configuration the minimum detectable object height, also called the "critical height", is about 1.5 ft. This is lower than bumper height of most common vehicles.

Figure 4:
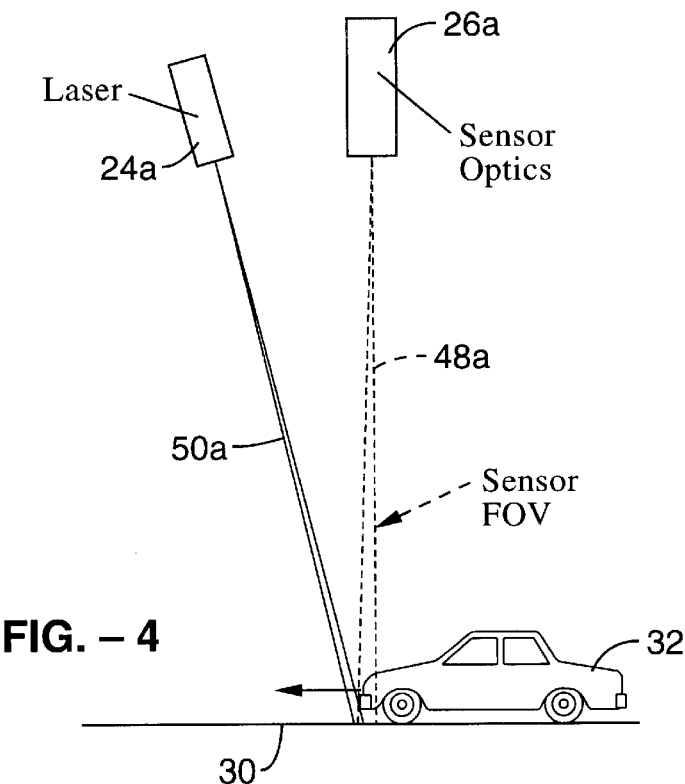
FIG. 4 is a schematic view of a vehicle entering a detection zone of the system shown in FIG. 2 and FIG. 3.
Figure 5:
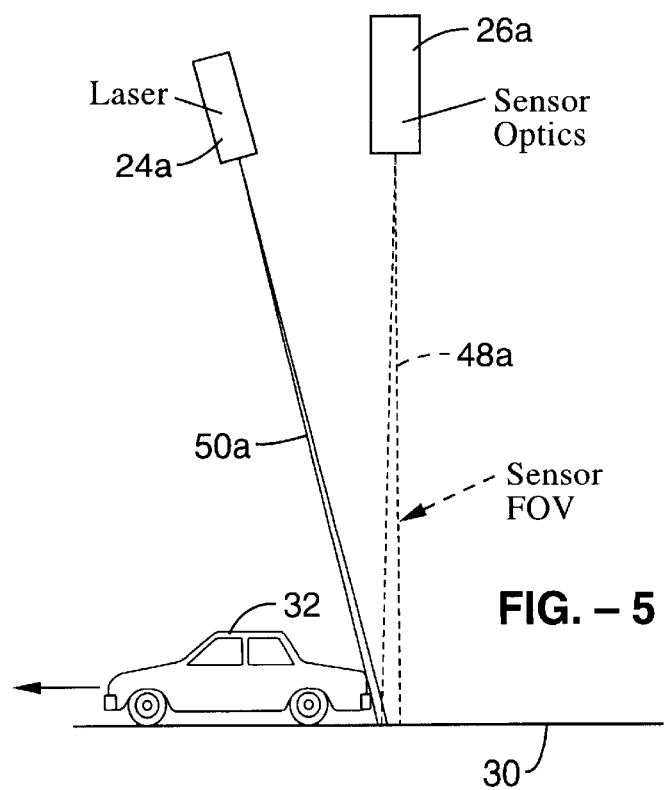
FIG. 5 is a schematic view of a vehicle exiting a detection zone of the system shown in FIG. 2 and FIG. 3.

When a vehicle 32 moves into a detection zone, it blocks the laser from being received by the sensor, as shown in FIG. 4. When the first beam 50a is blocked, the current time is recorded. When the second beam 50b is blocked, a second time is recorded. These times give the speed of the front of the car. In a similar manner, when each of the beams is no longer blocked, as shown in FIG. 5, the times are recorded and the speed of the rear of the vehicle can be calculated. The time that each detector is blocked is also recorded and is used to calculate the vehicle length, assuming constant vehicle acceleration. A more detailed description of the speed and length measurement methodology will be discussed later.

D. Sensor Optics

Figure 6:
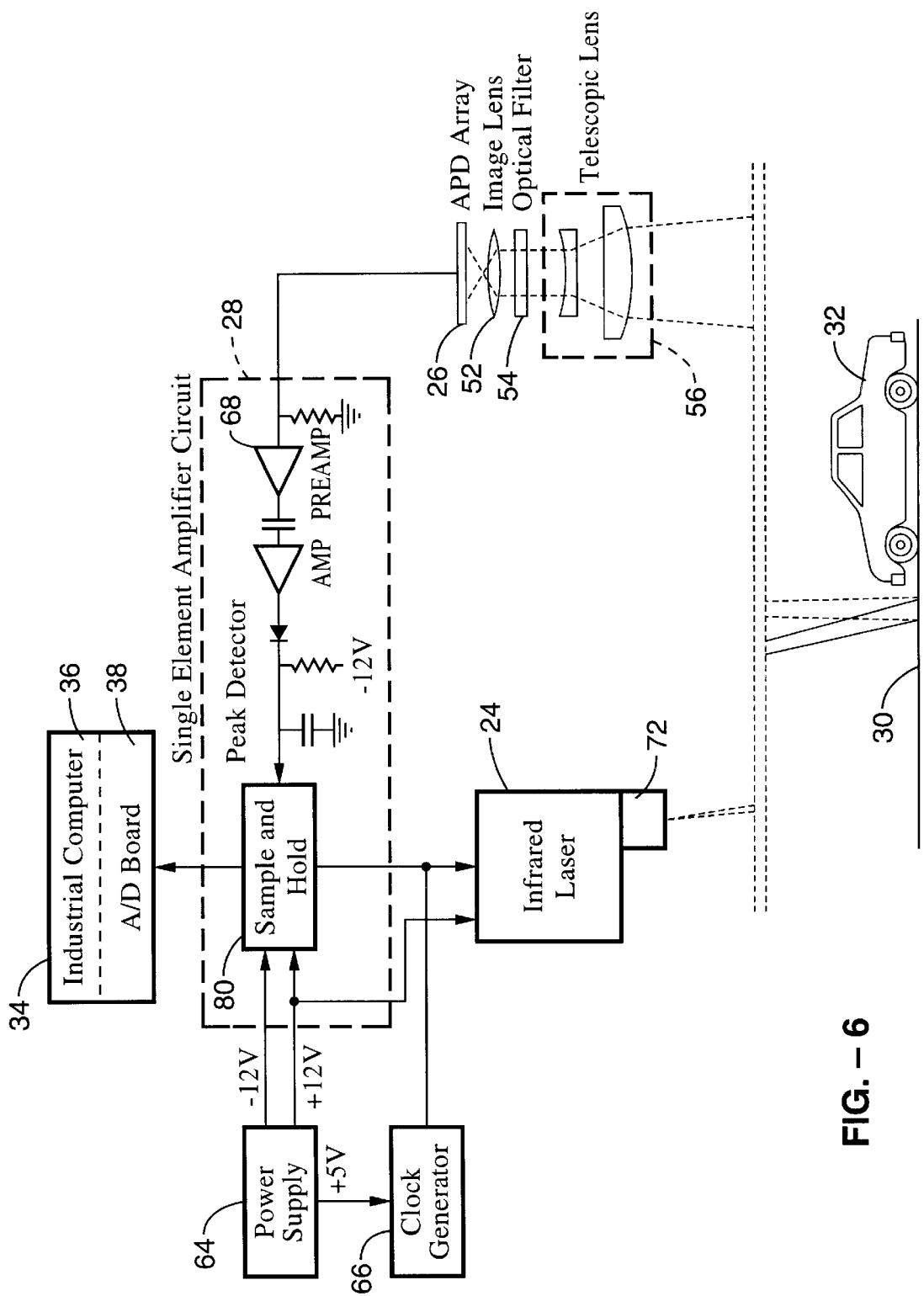
FIG. 6 is a functional block and schematic diagram of the hardware used in the also present invention.
Figure 7:
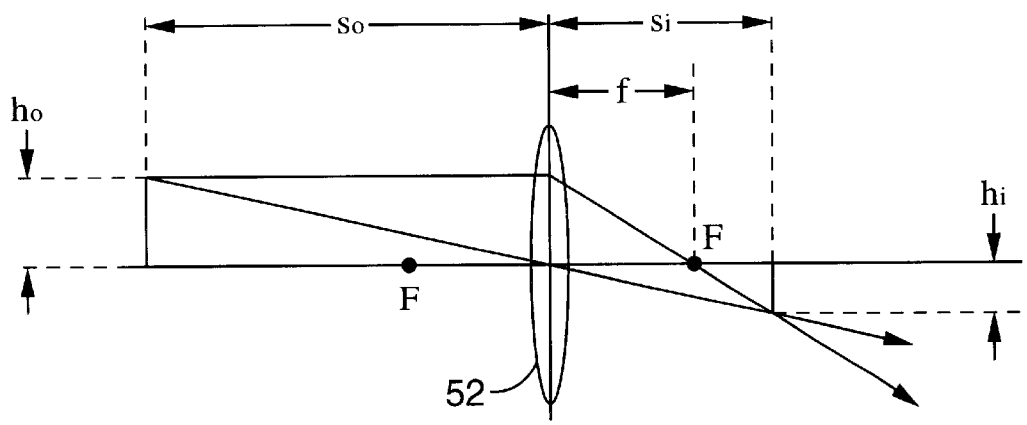
FIG. 7 is a diagram showing parameters of the image lens employed in the present invention.

Referring to FIG. 6, the sensor optics comprise three main components: an imaging lens system 52, an optical filter 54, and a telescopic lens system 56. The imaging lens system 52 focuses the reflected laser light onto the active area of the sensor array 26. Referring also to FIG. 7, the position ($s_i$) of the sensor relative to the imaging lens 52 and the focal length (f) of the imaging lens system 52 are calculated using Equations 2 and 3 based on the known highway lane width ($h_o$), the height above the road surface the system is to be mounted ($s_o$) and the length of the active area of the sensor ($h_i$).

$$\frac{s_i}{s_o} = \frac{h_i}{h_o} \quad (2)$$

$$s_i = s_o \frac{h_i}{h_o}$$

$$\frac{1}{s_i} + \frac{1}{s_o} = \frac{1}{f} \quad (3)$$

$$f = 1 \bigg/ \left( \frac{1}{s_i} + \frac{1}{s_o} \right)$$

Preferably, the imaging lens is selected based on the criteria that it should have an adjustable focal length within a range around the desired focal length, that it should have a field-of-view large enough to capture the width of an entire lane, and that it should be compact for easy integration into the outdoor system.

Based on the assumptions that the lane width ($h_o$) is around 10.0 feet (3.05 m) and that the unit will be mounted about 21.0 feet (6.40 m) above the roadway ($s_o$) and given that the sensor is approximately 0.295 inch (7.5 mm) long ($h_i$), an image distance ($s_i$) can be calculated for the sensor using Equation 2:

$$s_i = \left(21.0 \text{ ft.} \cdot 12 \frac{\text{in.}}{\text{ft.}}\right) \cdot \left(\frac{0.295 \text{ in.}}{10.0 \text{ ft.}} \cdot 12 \frac{\text{in.}}{\text{ft.}}\right)$$

$$s_i = 0.620 \text{ in. } (15.8 \text{ mm})$$

The desired focal length of the lens was then calculated using Equation 3:

$$f = \frac{1}{\frac{1}{s_i} + \frac{1}{s_o}}$$

$$f = \frac{1}{\frac{1}{0.620 \text{ in.}} + \frac{1}{21 \text{ ft.} \cdot 12 \frac{\text{in.}}{\text{ft.}}}}$$

$$f = \frac{1}{1.62 \text{ in.}}$$

$$f = 0.618 \text{ in. } (15.7 \text{ mm})$$

As a practical matter, the sensor array is placed at the focal point of the imaging lens system. Because $s_o$ is large in comparison with $s_i$, f is nearly equal to $s_i$.

The lens we selected, a Tamron 23VM816, has an adjustable focal length of between 0.315 in (8 mm) and 0.630 in (16 mm) and was selected because of this feature. The Tamron lens is also suitably compact and has a field of view that should be large enough to capture the entire lane width. However, any lens system that has the correct focal length and an acceptable field-of-view could be used.

The telescopic lens system 56 is mounted in front of the imaging lens system 52. It is preferably designed to restrict the field-of-view of the imaging lens along the width of the laser line, but not alter the field-of-view along the length of the line. Because the laser line is much longer than it is wide, use of the imaging lens alone would result in a much wider strip of pavement being visible to the sensor than is desired. Therefore, the telescopic lens system is used to match the dimensions of the laser line image with those of the sensor array.

Figure 8:
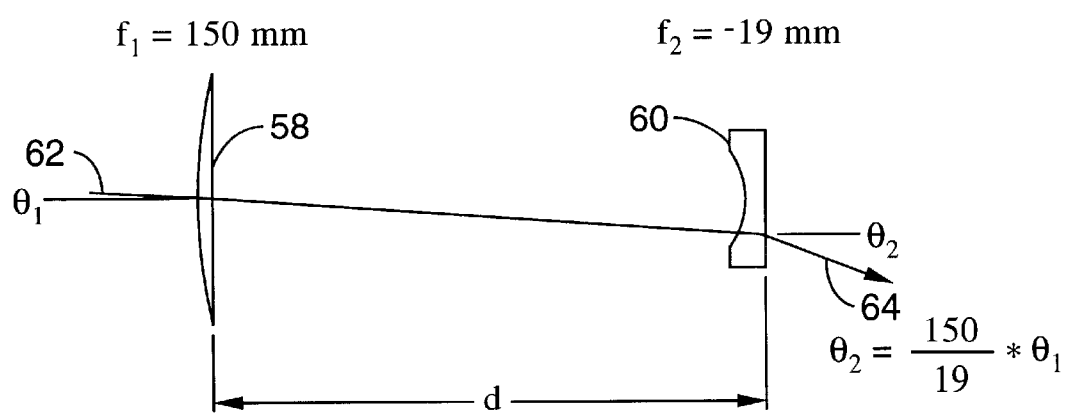
FIG. 8 is a diagram showing parameters of the telescopic lens employed in the present invention.

Referring also to FIG. 8, the telescopic lens system comprises one positive plano-cylindrical lens 58 and one negative plano-cylindrical lens 60. We used a 150.0 mm focal length cylindrical lens and a −19.0 mm focal length cylindrical lens manufactured by Melles Griot Inc. These lenses are positioned to form a Galilean telescope. When positioned properly the cylindrical lenses will not effect the proper operation of the imaging lens. The ratio of the focal length of these lenses is approximately equal to the ratio of the uncorrected field-of-view of the width of the sensor to the desired field-of view. The desired field-of-view, X, is determined based on Equation 4, where Y is the separation of the sensor and laser, H is the height of the system above the road, and $H_c$ is the desired minimum detectable object height, as shown in FIG. 1. To insure reliable vehicle detection, it is important that $H_c$ be below the bumper height of most common vehicles.

$$X = \frac{H_c Y}{H - H_c} \quad (4)$$

The uncorrected field of view, about 5.0 in., results in a critical height of about 6.0 ft. To ensure vehicle detection it is necessary to have a critical height somewhere below the bumper height of the vehicles. A height of around 1.5 feet was thought to be acceptable. To achieve this it is necessary to restrict the field of view X to about 0.92 in., which is a factor of reduction of about 5.0. In our case, where $f_1$=150.0 mm and $f_2$=−19.0 mm, the factor of reduction is equal to about −7.9 (the negative sign indicates an inverted image), giving us a field of view of about 0.63 in. The factor of reduction is commonly referred to as the angular magnification of the system. As shown in FIG. 8, a ray of light 62 entering the system from the left at an angle $\theta_1$ exits the system at the right at an angle $\theta_2$ equal to $\theta_1 \cdot f_1/f_2$. Because of this, objects to the left appear to be larger than they actually are. This is how the field of view is reduced. A sensor on the right of the telescopic system will have its field of view reduced by a factor equal to the angular magnification of the system. The telescopic system does not alter the position or focus of the image. Objects that are properly focused by the imaging lens remain in focus when the telescopic system is added.

A bandpass filter that is matched with the wavelength of the laser is used to reduce the level of ambient light received by the sensor. The filter 54 is mounted between the imaging 52 and telescopic 56 lens systems. The filter used in the prototype is a 904DF15 manufactured by Omega Optical Inc. This particular filter has a full-width half-maximum bandwidth of 15 nm centered at 904 nm, and is mounted on a ring that is threaded onto the front of the imaging lens.

E. System Electronics

Referring again to FIG. 2 and FIG. 6, a functional block diagram of an example of the hardware construct of the present invention is shown. The hardware can be divided into five main parts: the power supply 64, the clock pulse generator 66, the laser components 24, the sensor circuitry 28, and the ADC 38 and computer 36.

1. Power Supply

The power supply 64 delivers power to both the laser components and sensor circuit. Typically, there are many different voltages needed by the system. In the present invention, a triple output power supply provides +12 V, −12 V and +5 V. The +5 V output is used to power to the clock generator 66. The +12 V output supplies the high-power pulse laser system 24 and the DC/DC converter required for the sensor array 26. A high voltage DC/DC converter changes 12 V DC to 250 V DC to 350 V DC and is used to bias the sensor array to −290 V. The sensor circuit 28, except for the pre-amplifier 68, uses both the +12 V and −12 V outputs. For our triple-output DC power supply, the maximum output ripple is 5 mV Pk-Pk, which is a little large for a weak-signal amplifier power supply. In addition, the pulse laser consumes a large amount of power when the laser is turned on, such as a momentary current of approximately 20 A. This large current drain pulse will cause additional noise in the output voltage of power supply. Using a separate power supply for the pre-amplifier avoids this and increases the signal quality. In the preferred embodiment, a linear encapsulated power module, which produces +/−5V, is used to power the preamplifier. The maximum output ripple of that power supply is 1 mV Pk-Pk.

2. Clock Pulse Generator

Figure 9:
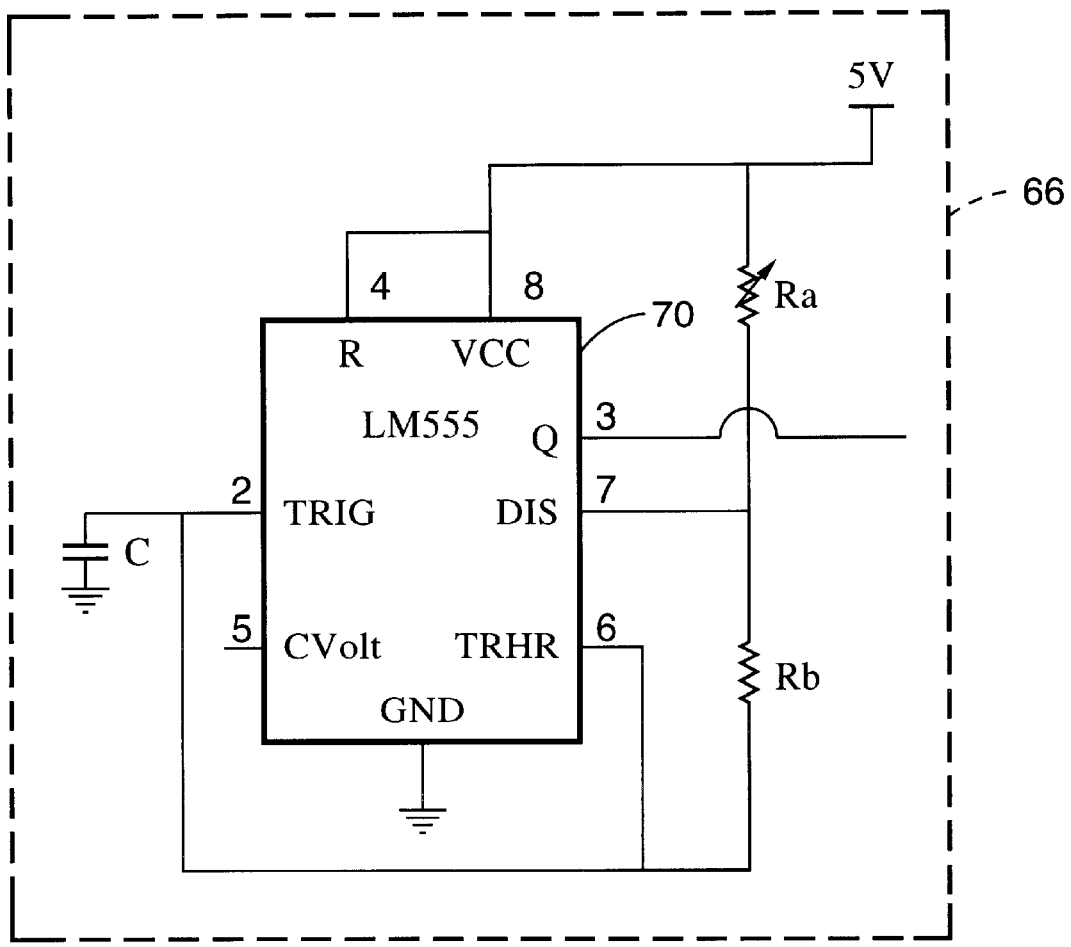
FIG. 9 is schematic diagram of the clock circuit shown in FIG. 6.

The clock generator 66 provides a clock signal that is used to trigger the laser and to synchronize it with the sampling of the photodiode sensor. In our system, an LM555 is used as the oscillator 70, as shown in FIG. 9. A 15 ns pulse-width, 2.2 kHz clock signal was chosen to operate the laser system.

The frequency and width of the pulse can be chosen by adjusting the values of resistors Ra and Rb. Increasing the value of Ra will increase the pulse frequency and increasing the value of Rb will increase the pulse width. It is anticipated that the clock frequency could be increased to 10 kHz.

3. Laser Components

An off-the-shelf integrated high-power diode laser system is used as the laser source 24. This system incorporates a DC/DC converter, power regulator, laser diode, and laser line generator into a single unit. The laser wavelength is 905 +/−10 nm with a pulse width 15 ns and a maximum pulse rate of 10 kHz. The laser's output power is 20.0 W peak with a quiescent operating current 28.0 mA. The line generating optics 72 produce a beam with a full fan angle is 37.0 degrees.

4. Sensor Circuit

A 25-element avalanche photodiode array 26 is used as the sensor in our detection system. The array is linear and positioned over the roadway such that the line of photodiodes traverses the roadway. Currently only four elements of each array are used, but in the future we plan to use all elements of the array. Each element in the array is sensed in parallel, and the sensor converts the reflected laser light in the filed of view into a current signal. It will be appreciated that the number of elements in the array can be varied depending upon the field of view or width of the roadway to be monitored.

The sensor circuit 28 is the main part of the electronic hardware in the detection system. This circuit conditions and amplifies the signal produced by a single element of the sensor array go that it is suitable for sampling by the data acquisition board. Each element of the photodiode array that is used has its own sensor circuit 28 as described below. In other words, if four elements in the array are used, there would be four instances of sensor circuit 28, each receiving a signal from its associated photodiode element and providing an output to an associated channel in the A/D converter. As discussed, the signals from each of the elements in the photodiode array are processed in parallel.

Figure 10:
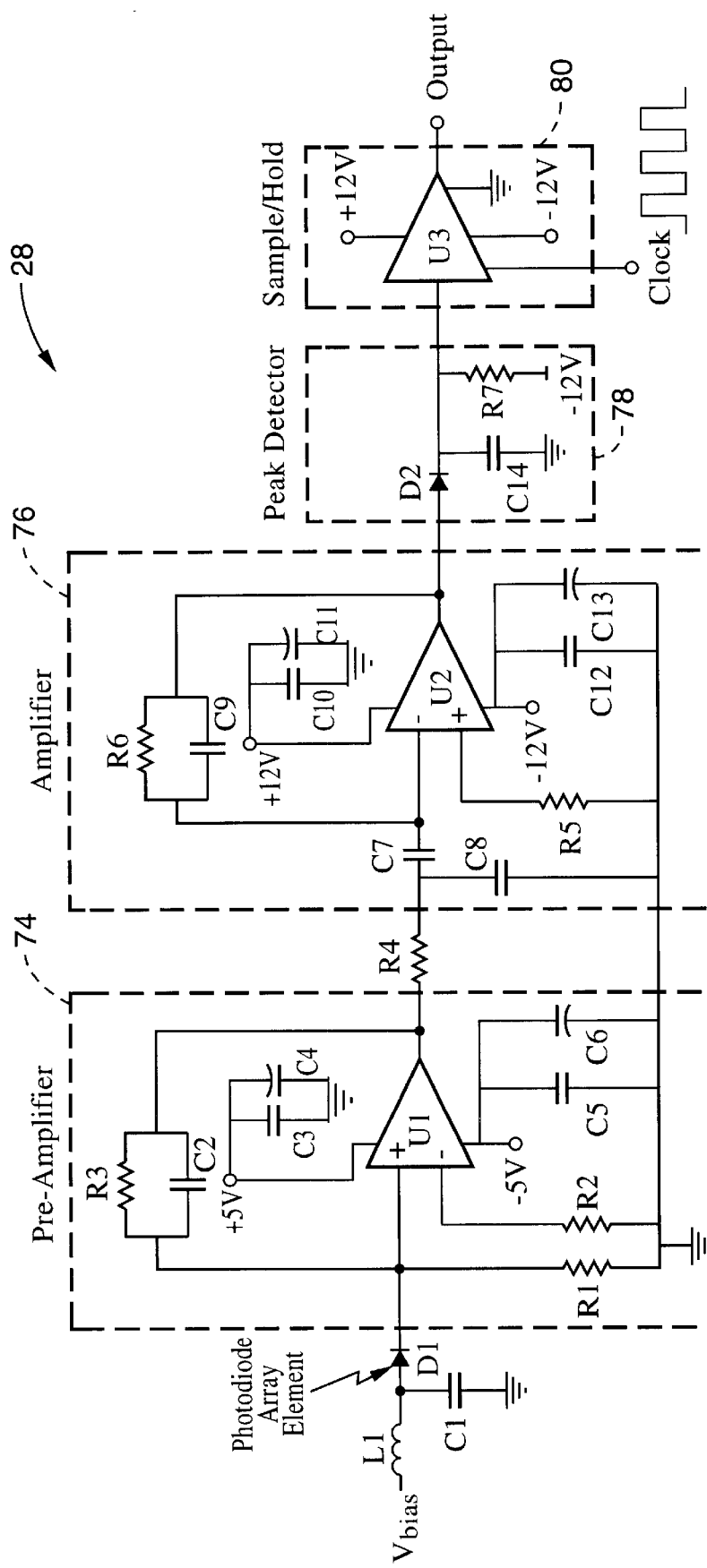
FIG. 10 is a schematic diagram of the sensor circuit shown in FIG. 6.

Referring to FIG. 10, the sensor circuitry 28 can be divided into four stages: signal conditioner and preamplifier 74, signal conditioner and amplifier 76, peak detector 78, and sample/hold 80. The current produced by a sensor element D1 is converted to a voltage by U1. U1 is a low-noise, high-speed amplifier and is used in a non-inverting configuration. C2 is a small value capacitor used for noise reduction. The signal is then passed to amplifier stage 76 through a resistor, R4, and capacitor, C7, which filters out the DC or low frequency signals components from the previous stage. U2 is used as an inverting amplifier. The signal is amplified to a suitable value for the computer to handle. Similar to the pre-amplifier stage 74, C9 is used to further reduce the noise. The amplified signal is a voltage pulse. The peak detector 78 is needed to pick up the signal peak and deliver it to the sample/hold circuit 80. D2 and C14 comprise a peak detector. The output of the amplifier stage 76 charges C14 through diode D2. The highest point of the output waveform of the amplifier is held by C14 while the diode D2 is back-biased. R7 and a −12V power supply are used to reset the capacitor C14. The detected peak is then input to the sample/hold circuit. This circuit uses the same clock pulse that is used as a trigger by the laser to synchronize sampling of the signal with the laser pulse. C3, C4, C5, C6 and C10, C11, C12, C13 are de-coupling capacitors which filter noise from the power supply. Typical component values are shown in Table 1.

TABLE 1

| Label | name | value |
|---|---|---|
| R1 | resistor | ⅛ Watt 6.7k ohm |
| R2 | resistor | ⅛ Watt 12 ohm |
| R3 | resistor | ⅛ Watt 680 ohm |
| R4 | resistor | ⅛ Watt 12 ohm |
| R5 | resistor | ⅛ Watt 12 ohm |
| R6 | resistor | ⅛ Watt 4.7k ohm |
| R7 | resistor | ⅛ Watt 80k ohm |
| C1 | capacitor | 400 V 0.1 uF |
| C2 | capacitor | 25 V 4 pF |
| C3 | capacitor | 25 V 0.1 uF |
| C4 | capacitor | 25 V 1 uF |
| C5 | capacitor | 25 V 0.1 uF |
| C6 | capacitor | 25 V 1 uF |
| C7 | capacitor | 25 V 0.22 uF |
| C8 | capacitor | 25 V 560 pF |
| C9 | capacitor | 25 V 4 pF |
| C10 | capacitor | 25 V 0.1 uF |
| C11 | capacitor | 25 V 1 uF |
| C12 | capacitor | 25 V 0.1 uF |
| C13 | capacitor | 25 V 1 uF |
| C14 | capacitor | 25 V 360 pF |
| L1 | inductor | 5 mH |
| U1 | amplifier | OPA655 |
| U2 | amplifier | LM1364 |
| U3 | Sample/holder | LF198 |
| D1 | photodiode | APD array |
| D2 | diode | 1N4148 |

5. A/D Converter and Computer

Referring again to FIG. 2 and FIG. 6, the output from the sample/hold stage 80 is an analog signal that must be digitized for processing. A 16-channel A/D board 34 installed in a programmed data processor 36 is used for this purpose. The converted digital data is then sent to processor 30 through the data bus for further handling. In our system processor 36 is an industrial grade Pentium® computer running under a real-time operating system. Custom software is used for processing of the data as described below.

F. System Software

Figure 11:
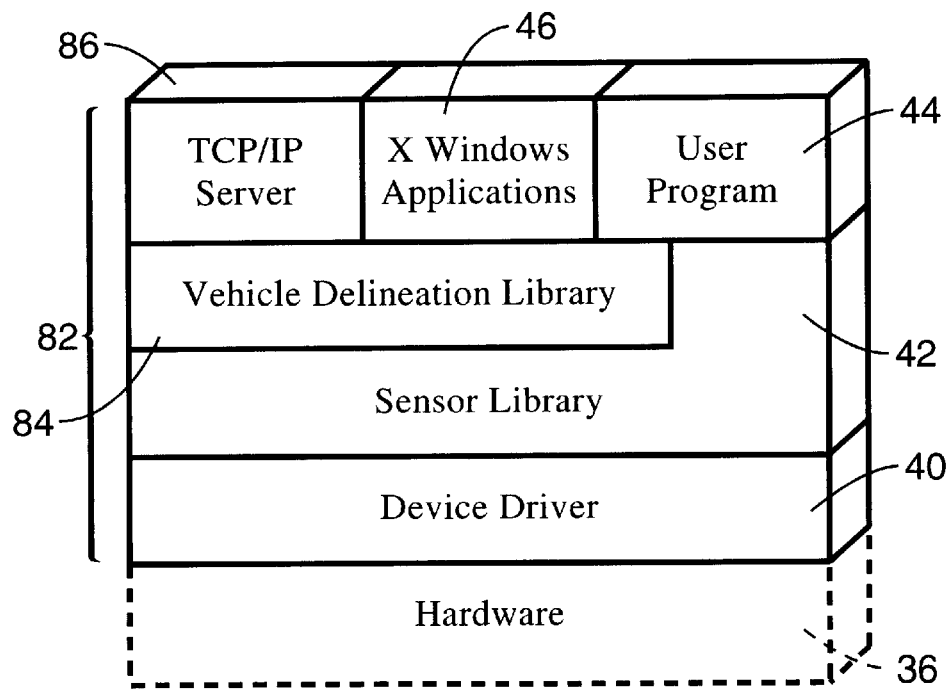
FIG. 11 is a diagram showing the architecture of the software employed in the present invention.

The purpose of the laser detector software 82 is to collect, process and display vehicle delineation data, all in real-time. The software is separated into layers by function, as shown in FIG. 11. Each layer performs a specific function and hides the implementation from other layers. The layers interact and pass data by using function calls. As described above, the computer hardware obtains the data from the detector and converts the data into digital form for processing by the system software.

Referring to FIG. 2 and FIG. 11, the first layer of software is the device driver layer 40 that communicates with the computer hardware 36 in a low-level fashion. The interface to the data acquisition device driver occurs through standard function calls, such as open( ), close( ), read( ), write( ) and ioctl( ). The device driver hides the low-level a interaction between the data acquisition hardware go the rest of the sensor software does not have to be burdened with low-level communication. The device driver uses a circular queue to buffer the data while it is continuously collecting data from the data acquisition board so no data is lost between requests for the data.

The sensor library layer 42 requests detector data from the device driver and processes the data for applications and, other software libraries. The sensor library is used by both a vehicle delineation library 84 and the applications in the top layer of the software. A TCP/IP server 86 is used to send the vehicle data over a network, X Windows System applications 46 are used to display the detector and vehicle data in real-time, and a user program 44 is used to perform simple operations on the data.

1. Sensor Library

The sensor library 42 is the largest portion of the software that obtains detector data from the data acquisition device driver 40 and processes the data for other applications and software libraries. The sensor library requests data from the device driver in a specified block size. The library converts the data from digitized values to various forms. The library consists of various levels of functionality. The library is multi-tasking and multi-threaded. It is multi-tasking because the various tasks must occur simultaneously. Multi-tasking is implemented by using threads that run at separate scheduling priorities. A thread at a higher priority blocks other threads from running. Using priority-based threads increases the responsiveness of the software for real-time data acquisition.

Figure 12:
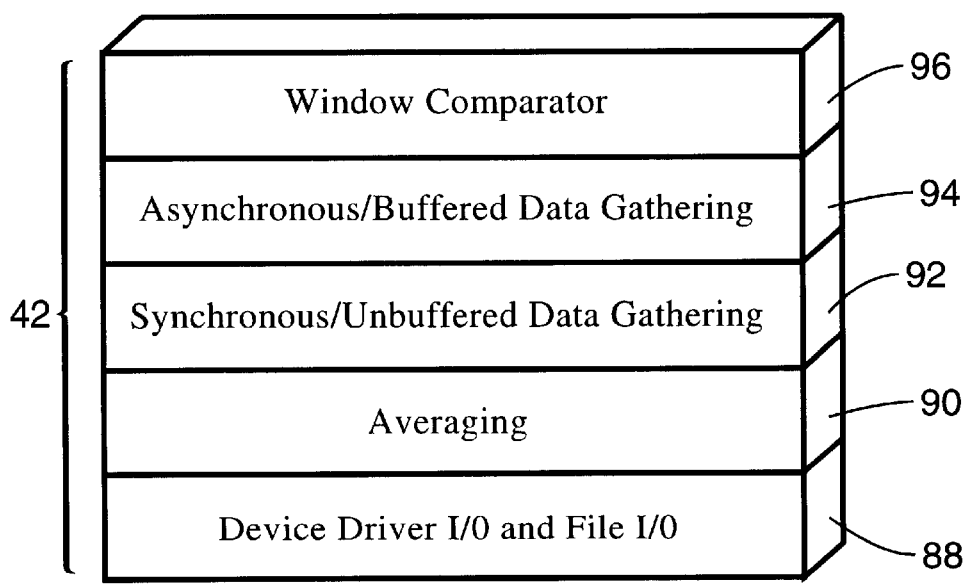
FIG. 12 is a diagram showing the architecture of the sensor library shown in FIG. 11.

FIG. 12 shows the separate modules of the sensor library 42. At the bottom is the device driver function calls and the file input and output (I/O) function calls 88. The next layer is the averaging layer 90 that computes the running average of the sensor signal. The number of samples to average is configurable on the fly. The Synchronous/Unbuffered Data Gathering layer 92 is the layer that sets up and gathers the data from the device driver. This layer contains the highest priority thread that encompasses the averaging layer and device driver and file I/O layer. The layer is synchronous because the interaction between the high priority thread and the application is synchronized. It is unbuffered because no buffer exists between the thread and the application requesting the data.

The next layer is the Asynchronous/Buffered Data Gathering layer 94. This layer sets up and uses a buffer that allows asynchronous requests of data while the high priority thread reads the data and stores them in the buffer. This method is desirable because the application does not directly affect the gathering of data. As a result, no data is lost.

The top-most layer of the sensor library is the window comparator 96. The window comparator converts floating-point signal values to detection states, and compares them with thresholds to indicate whether or not the laser is blocked. A blocked laser indicates the presence of a vehicle for that particular element of the photodiode array. The comparator is configurable during run time to be more responsive to changing signal conditions.

Figure 13:
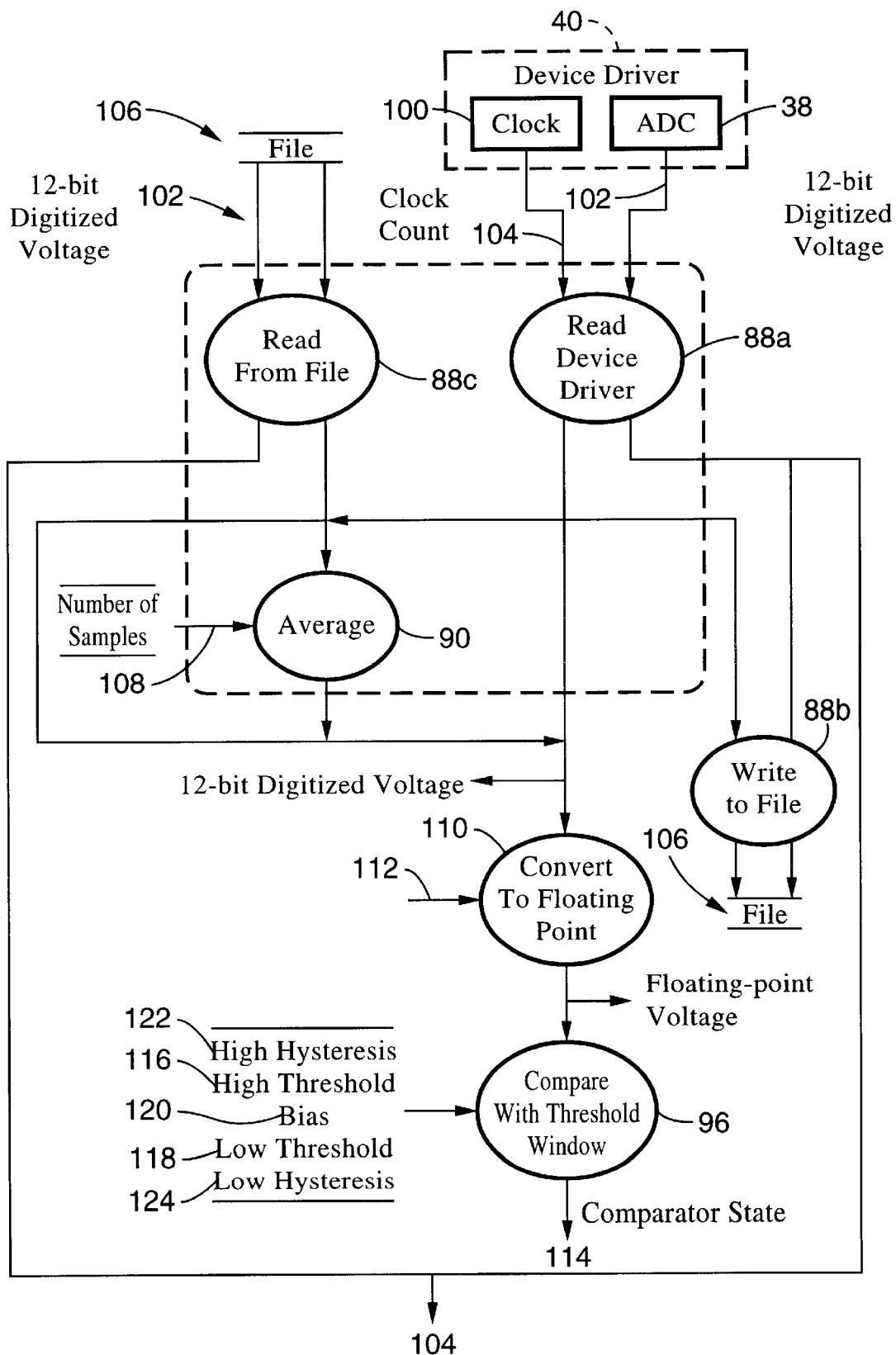
FIG. 13 is a functional diagram of the sensor library shown in FIG. 11 and FIG. 12.

FIG. 13 shows the functional diagram of the sensor library, which shows the data flow between the separate functions and modules. The sensor library requests data from the device driver 40 at 88*a* as though it was directly requesting data from the analog-to-digital converter (ADC) 38 and the clock 100 on the data acquisition hardware. Data from ADC 38 are in the form of 12-bit digitized voltage values 102. The clock count 104 is a 32-bit number representing the ticks of time. Each block of data contains a clock count so that each sample of data can be linked directly to an instance in time. At 88*b* the sensor library has the option to save the clock counts and digitized values to a file 106 for later playback or use the values directly from the device driver. The averaging function of the sensor library converts a specified number of samples to a single average voltage. This is done to eliminate random noise read from the ADC. The reading of the device driver at 88*a*, file reading at 88*c* and averaging a number of samples 108 at 90 are all performed within a thread that is scheduled at a high priority. The writing of data to a file at 88*b* is contained within a low priority thread so the gathering of data is not interrupted. All other functions are within the same priority of the application program using the sensor library.

Next, the digitized values are converted to floating-point voltages at 110 by dividing the digitized value by the total voltage range 112 of the ADC. Once the data has been converted, the voltages can be used directly and passed through a window comparator 96. The window comparator portion of the sensor library converts the voltage values to a comparator state 114. The comparator comprises a window bordered by a high threshold level 116 and a low threshold level 118. The software compares the current voltage value with the high and low threshold values. When the value is between the two thresholds, the state of the comparator is false and when the a value is above or below the threshold, the comparator state is true. Before the software compares the value to the threshold levels, it removes a bias voltage value 120. The bias voltage value is the level of the ADC when the laser is blocked. In other words, the software comparator removes the ambient light from the voltage value to only compare the signal of the laser to the threshold levels.

One problem with window comparators is how they handle noise. Rapid transitions across the threshold levels cause the comparator state to change rapidly. To remedy this problem, feedback or hysteresis is used to eliminate rapid changes of state due to noisy signals. An electrical hardware device that implements this is known as a Schmitt trigger [5]. The trigger uses a small envelope to essentially widen the threshold level the signal would have to pass completely through for the comparator to change states. The size of the envelope for the high threshold level is specified by the high threshold level 116 on the bottom and the high hysteresis level 122 on top. The size of the envelope for the low threshold level is specified by the low threshold level 118 on the top and low hysteresis level 124 on the bottom. The envelope size is adjusted according to the noise level of the signal to eliminate rapid changes in comparator states.

2. Vehicle Delineation Library

Figure 14:
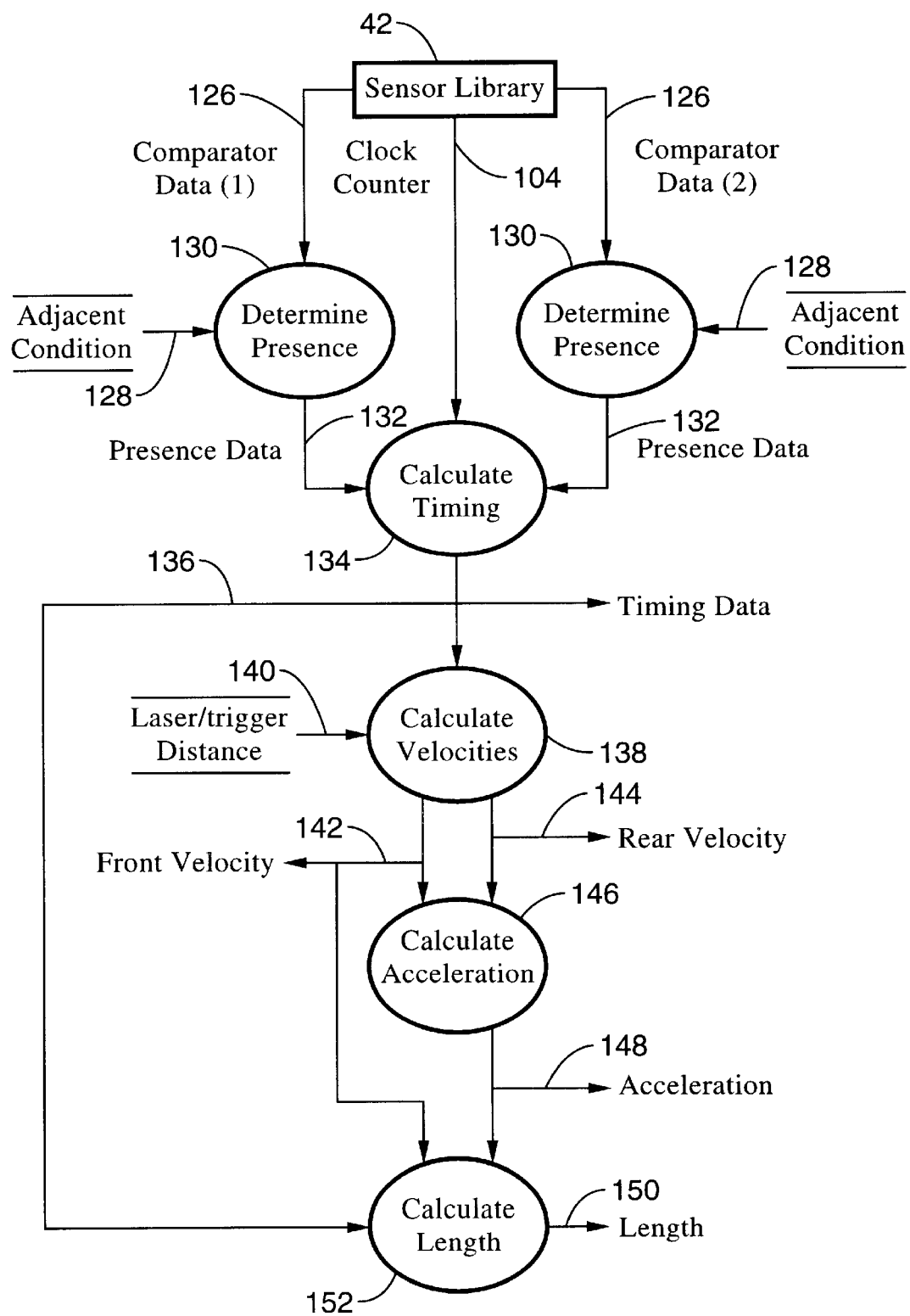
FIG. 14 is a functional diagram of the vehicle delineation library shown in FIG. 11.

The purpose of the vehicle delineation library 84 (FIG. 11) is to convert sensor library data to vehicle delineation data, such as vehicle timing information, front velocity, rear velocity, average acceleration and ultimately length. FIG. 14 shows the functional diagram of the vehicle delineation library, indicating the flow of data between the functional aspects of the library. The vehicle delineation library obtains comparator data 126 from the sensor library and determines if a vehicle is present based on the comparator states of the photodiode array. The library examines the comparator states of each element of the array. A vehicle is considered present at 130 when a specified number of adjacent comparator states 128 are true. Essentially, the library converts a series of comparator states for the photodiode array to a single vehicle presence state 132.

Figure 15:
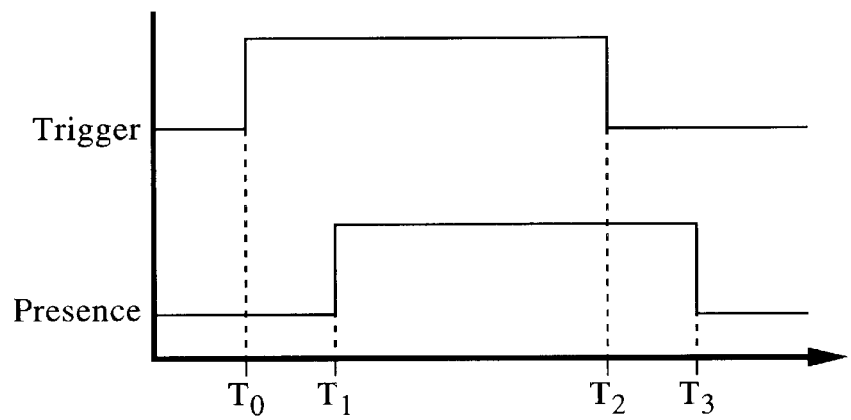
FIG. 15 is a timing diagram showing the timing of signals from the two sensors of the present invention when a vehicle passes under the sensors.

Once the presence state is determined, the software calculates the timing of the front of the vehicle and the rear of the vehicle at 134. If the presence state is false, no timing will be calculated. The vehicle passes under the first sensor and the software indicates that the vehicle is present for that particular sensor. Then the vehicle passes under the second sensor and the software indicates it is present for that sensor. The vehicle library calculates the time between the edges of the presence states of the two sensors using the clock count from the sensor library. A clock count is associated with each block of data so each instant of time of every sample of data can be calculated. FIG. 15 shows the timing of the two sensors. The front of the vehicle is indicated by times $t_0$ and $t_1$ and the rear of the vehicle is indicated by $t_2$ and $t_3$.

The timing data 136 is used by the vehicle library to calculate the front velocity and the rear velocity of a detected vehicle at 138. The software uses the time interval of the two sensors and distance between them 140 to calculate the front velocity $v_0$ 142, $$v_0 = \frac{d}{t_1 - t_0} \quad (5)$$

where d is the distance between the two sensors. The rear velocity 144 is calculated in similar fashion $$v_1 = \frac{d}{t_3 - t_2}. \quad (6)$$

At 146, the velocities are used to calculate the average acceleration of the vehicle 148 as it passed under the two laser sensors. The calculation is based on the front velocity, $v_0$, and the rear velocity, $v_1$, and the first edge for the first sensor, $t_0$, and the first edge of the second sensor, $t_2$, $$a = \frac{v_1 - v_0}{t_2 - t_0} \quad (7)$$

The length 150 of the vehicle is determined at 152 from the front velocity, the timing of the first edges and the average acceleration $$l = v_0(t_2 - t_0) + \frac{1}{2}a(t_2 - t_0)^2 \quad (8)$$

The vehicle delineation library groups all of the above calculated parameters into one structure and makes the data available for reading by an application. The group contains the timing information, the front and rear velocities, average acceleration and finally the calculated length of the vehicle.

Those skilled in the art will appreciate that the software to implement the functions of the invention as described herein can be written for various platforms using conventional programming techniques. Accordingly, specific code is not presented herein.

EXAMPLE 1

Figure 16:
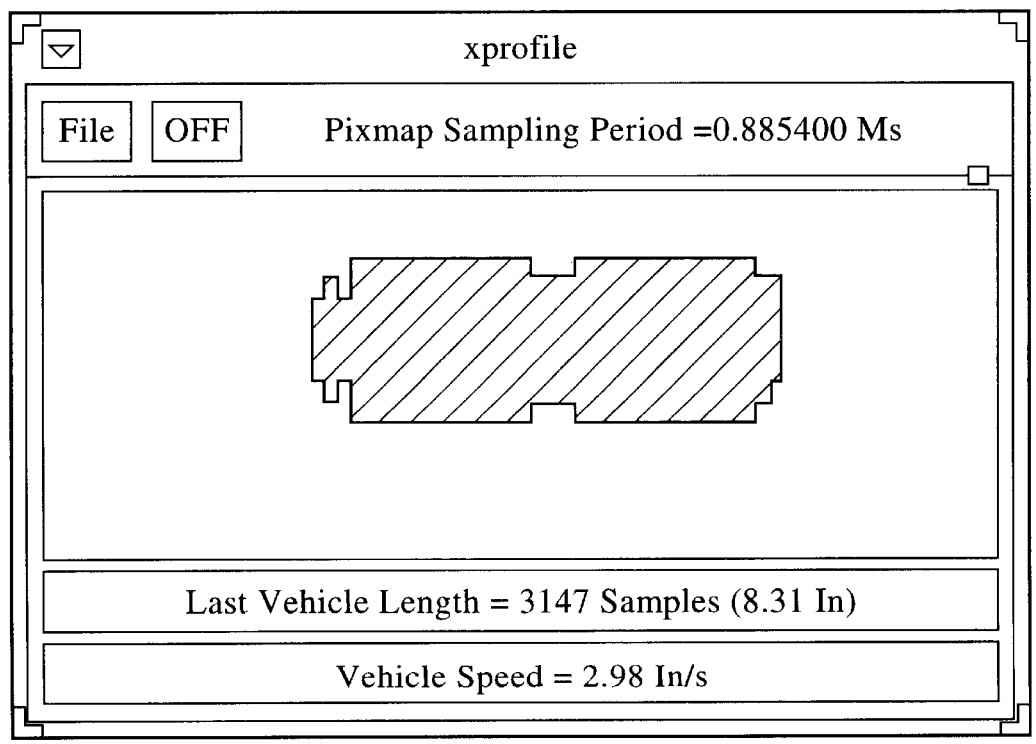
FIG. 16 is a diagram showing the overhead profile of a miniature vehicle obtained sing eight elements of a single sensor array.
Figure 17:
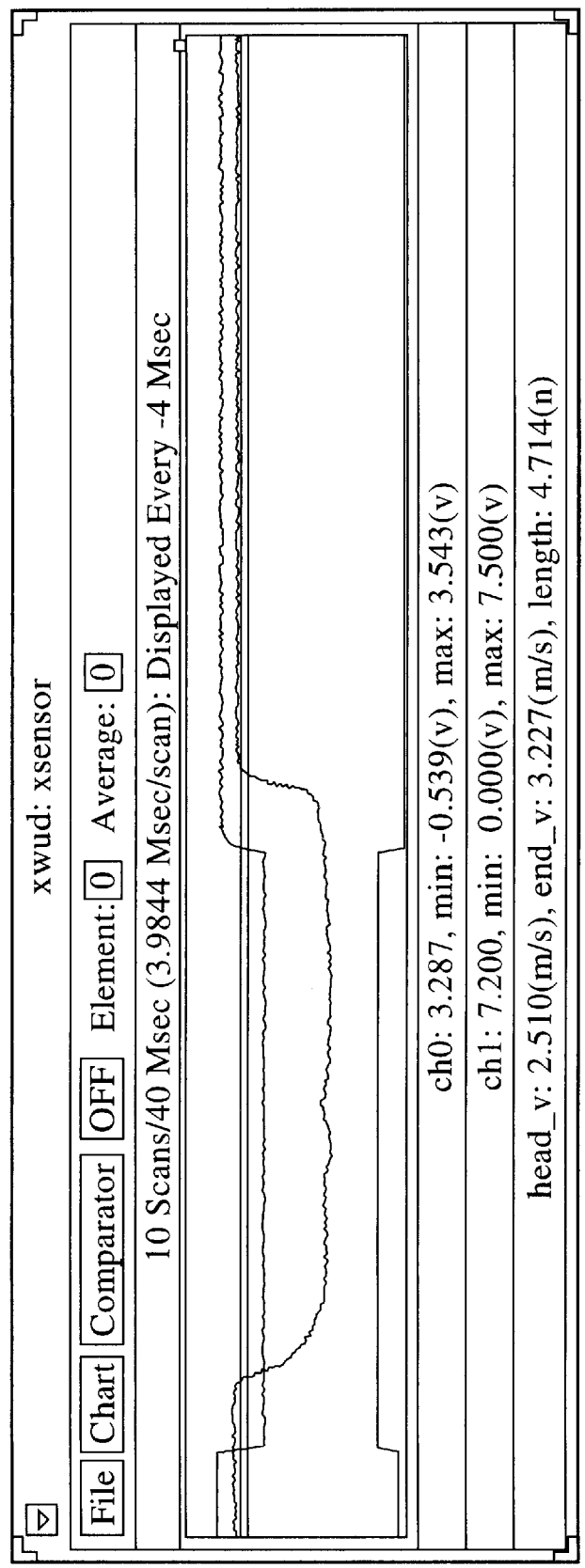
FIG. 17 is a diagram showing test results obtained from a full-size vehicle.

Preliminary testing was conducted indoors using a toy truck. FIG. 16 shows an overhead profile of the vehicle obtained using eight elements of a single sensor array. Outdoor testing of the development system was also conducted using a full-size vehicle. The results, shown in FIG. 17, were collected primarily to verify the proper operation of the system components. During this testing, a total of eight elements (four elements from each sensor array) were used. From the test results, we can notice that the vehicle blocks the lasers sequentially. The displayed data show that the speed of the front of the vehicle was around 5.615 miles/h (2.510 m/s), the rear speed was around 7.219 miles/h (3.227 m/s) and the length was around 4.714 m. The rear speed was larger than front speed because the vehicle was accelerating. The critical height was around 18 inches, near the desired value. The accuracy of the vehicle length is better than a few centimeters in different tests. We have tested the system several times in different temperature and weather conditions including day and night, sunshine and fog. The results were consistent.

G. CONCLUSIONS

We have introduced an alternate method of addressing the use of VAP. The system we have developed is mounted above the road and, as a result, is relatively easy to install. The system is insensitive to ambient lighting conditions due to its active signal source (the laser). The data gathered by the sensor are computationally easy to process. Through a series of preliminary indoor and outdoor tests, it was confirmed that our method of speed and length measurement can be used to distinguish characteristics of moving vehicles. We have successfully designed and built the optics and electronics for the system. The prototype system has provided us with some useful data that have verified the validity of our design.

H. FUTURE ENHANCEMENTS

The above described prototype detection system is a proof-of-concept implementation. In the future we intend to extend the system to include additional detection methods and improvements. In this section some possible improvements are described.

As mentioned previously, each sensor array has twenty-five elements, however only four are currently used on each sensor. In the future it would be reasonable to use all twenty-five elements, or to use an array with additional elements. More elements would provide greater lateral resolution and would allow us to determine the lateral shape factor of laterally symmetrical objects such as vehicles. We could use the coefficients of a curve fit of this curvature as additional feature vectors that would help delineate vehicles with the same length from one another.

The detector could also be modified to determine the infrared color, or differential chromatic reflectance, of vehicles as another delineating feature. This is basically the quantitative ratio of laser light of different frequencies reflected off the same part of the vehicle at the same emitter-detector angle. Because the ratio will vary with the reflective properties of the individual vehicle part, the mode value will represent IR reflectance of the predominate color of the vehicle. This would be incorporated into this detector prototype most easily using the same optics by inserting a 760 nm and 840 nm laser in the same plane as sensor 26*a* in FIG. 3 and incorporating a sub-900 nm mirror between the Telescopic Lens and Optical Filter in FIG. 6. The sub-900 reflection would then be split and filtered into 760 nm and 840 nm components. Because the reflectance off the vehicle is expected to be much higher then off the pavement, continuous wave (CW) lasers and a single element photodiode, or a photodiode array with a few elements, could be used, thereby significantly lowering cost.

It is necessary for this detector to determine the precise length of the vehicle in stop and go traffic when a non-linear change in velocity between the front and back bumpers can yield an erroneous vehicle length. By incorporating two of the above configurations used for differential chromatic reflectance in each return optical plane, it is possible to use the peak reflectance sequences as patterns which can be re-recognized between the detectors in each plane. This will allow the determination of the exact change in velocity of the vehicle while it is under the detector, which will allow much more precise determination of vehicle lengths at low speeds.

It is also anticipated to modify this system so that it can be used for in-situ vehicle pollutant detection. This is can be accomplished by simply changing the frequency of the laser line generator in FIG. 1 so that the laser light is slightly absorptive by the pollutant. After the vehicle passes the detector, the reflection of the laser off the pavement will be attenuated by the quantity of pollutants emitted. By the time the next vehicle arrives, its turbulent wake will entrain enough surrounding air to allow a fresh pollution measurement. This has advantages over existing in-situ vehicle pollutant an detectors in that it integrates the entire area behind the vehicle and is not subject to misreading due to turbulent looping, and it is not a side-fire detector so it can be used to individually assess multiple lanes.

Accordingly, it will be seen that this invention provides a non-intrusive laser-based system for detecting objects moving across a planar surface that can unambiguously find the object boundaries in all lighting conditions independent of the time-of-flight of the laser. The invention is based on using a single emitter with an array of detectors. By using an array of detectors, and by offsetting the planes in which the omitted and reflected signals are processed, multiple reflected signals can be processed simultaneously. This eliminates the need for time of flight measurements, which is a significant improvement over conventional technology and allows very accurate length measurements without computational complexity. Unlike conventional systems which depend on signals reflected by the vehicle, the present invention uses the roadway itself as the mirror and absence of reflected signals indicates an object. Rotating mirrors are not required as in prior systems and the entire width of the roadway can be viewed with a linear array of photodiodes sampled in parallel. Furthermore, the beam emitted by the laser does not have to be in the same plane as the field of view of the sensor, and the only point of intersection of the plane of the laser and that sensor in at the roadway surface since the roadway surface is being used an the mirror.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An apparatus for determining the length of an object moving along a planar surface, comprising:
   (a) a laser transmitter, said laser transmitter including a line generator configured to generate a fan angle beam of light in a first plane directed toward a planar surface;
   (b) a laser receiver, said laser receiver spatially offset from said laser transmitter, said laser receiver including a linear array of photodiodes configured to have a field of view for detecting light reflected from said planar surface in a second plane which is offset from said first plane; and
   (c) a programmed data processor, said programmed data processor including software for carrying out the operations of processing signals received from said laser receiver and determining the length of an object passing through the field of view of the laser receiver based on absence of reflection of said beam of light from said planar surface.

2. An apparatus as recited in claim 1, further comprising an image lens positioned between said laser receiver and said planar surface.

3. An apparatus as recited in claim 2, further comprising a telescopic lens positioned between said image lens and said planar surface.

4. An apparatus as recited in claim 3, further comprising an optical filter positioned between said image lens and said telescopic lens.

5. An apparatus as recited in claim 1, wherein said photodiodes in said linear array are sampled in parallel.

6. An apparatus for determining the length of a vehicle moving along a planar roadway surface in longitudinal direction, comprising:
   (a) a laser emitter:
   (b) a line generator associated with said laser emitter, said laser emitter and said line generator configured to generate a fan angle beam of light laterally across said roadway surface in a first vertical plane angularly offset from a vertical plane perpendicular to said roadway surface;
   (c) an optical sensor, said optical sensor having a linear array of photodiodes positioned with a field of view in a second plane substantially perpendicular to said roadway surface; and
   (d) a computer, said computer including software for carrying out the operations of processing signals received from photodiodes in parallel and determining the length of said vehicle passing through the field of view of said optical sensor based on absence of reflection of said beam of light from said roadway surface.

7. An apparatus as recited in claim 6, further comprising an image lens positioned between said optical sensor and said planar surface.

8. An apparatus as recited in claim 7, further comprising a telescopic lens positioned between said image lens and said planar surface.

9. An apparatus as recited in claim 8, further comprising an optical filter positioned between said image lens and said telescopic lens.

10. An apparatus for determining the length of a vehicle moving along a planar roadway surface in a longitudinal direction, comprising:
    (a) a pulsed infrared laser positioned above a plane of detection;
    (b) line generating optics associated with said laser for protecting A beam on said roadway surface laterally in relation to said direction of travel of said vehicle;
    (c) a photodetector positioned above said plane of detection and spatially offset from said laser, said photodetector including a plurality of linearly positioned photodiodes;
    (d) imaging optics associated with said photodetector;
    (e) said photodetector having a field of view laterally across said roadway surface in relation to said direction of travel of said vehicle;
    (f) wherein said beam from said laser is projected in a first plane and said field of view of said photodetector is in a second plane angularly offset from said first plane in relation to said roadway surface; and
    (g) a computer, said computer including software for carrying out the operations of processing signals received from photodiodes in parallel and determining the length of said vehicle passing through the field of view of said photodetector based on absence of reflection of said beam of light from said roadway surface.

11. An apparatus as recited in claim 10, wherein said imaging optics comprises:
    (a) an image lens positioned between said photodetector and said planar surface; and
    (b) a telescopic lens positioned between said image lens and said roadway surface.

12. An apparatus as recited in claim 11, further comprising an optical filter positioned between said image lens and said telescopic lens.

13. An apparatus for determining the length of an object moving along a planar surface, comprising:
(a) a first detector unit;
(b) a second detector unit spatially offset from said second detector unit;
(c) each said detector unit comprising,
  (i) a laser transmitter, said laser transmitter including a line generator configured to generate a fan angle beam of light in a first plane directed toward a planar surface, and
  (ii) a laser receiver, said laser receiver spatially offset from said laser transmitter, said laser receiver including a linear array of photodiodes configured to have a field of view for detecting light reflected from said planar surface in a second plane which is offset from said first plane; and
(d) a programmed data processor, said programmed data processor including software for carrying out the operations of processing signals received from said laser receiver and determining the length of an object passing through the field of view of the laser receivers based on absence of reflection of said beams of light from said planar surface.

14. An apparatus as recited in claim 12, wherein each said detector unit is includes an image lens positioned between said corresponding laser receiver and said planar surface.

15. An apparatus as recited in claim 14, wherein each said detector unit includes a telescopic lens positioned between said corresponding image lens and said planar surface.

16. An apparatus as recited in claim 15, wherein each said detector unit includes an optical filter positioned between said corresponding image lens and said corresponding telescopic lens.

17. An apparatus an recited in claim 13, wherein said photodiodes in each said linear array are sampled in parallel.

18. An apparatus for determining the length of a vehicle moving along a planar roadway surface in longitudinal direction, comprising:
(a) a optical first emitter/sensor pair;
(b) a optical second emitter/sensor pair;
(c) each said optical emitter/sensor pair comprising
  (iii) a laser emitter,
  (ii) a line generator associated with said laser emitter, said laser emitter and said line generator configured to generate a fan angle beam of light laterally across said roadway surface in a first vertical plane angularly offset from a vertical plane perpendicular to said roadway surface, and
  (iii) an optical sensor, said optical sensor having a linear array of photodiodes positioned with a field of view in a second plane substantially perpendicular to said roadway surface; and
(d) a computer, said computer including software for carrying out the operations of processing signals received from photodiodes in parallel and determining the length of grid vehicle passing through the field of view of said optical sensors based on absence of reflection of said beam of light from said roadway surface.

19. An apparatus as recited in claim 18, wherein each said optical emitter/sensor pair includes an image lens positioned between said corresponding optical sensor and said and said planar surface.

20. An apparatus as recited in claim 19, wherein each said optical emitter/sensor pair includes a telescopic lens positioned between said corresponding image lens and said planar surface.

21. An apparatus as recited in claim 20, wherein each said optical emitter/sensor pair includes an optical filter positioned between said corresponding image lens and said corresponding telescopic lens.

22. An apparatus for determining the length of a vehicle moving along a planar roadway surface in a longitudinal direction, comprising:
(a) first and second laser detector units, each said laser detector unit comprising
  (i) a pulsed infrared laser positioned above a plane of detection,
  (ii) line generating optics associated with said laser for protecting a beam on said roadway surface laterally in relation to said direction of travel of said vehicle,
  (iii) a photodetector positioned above said plane of detection and spatially offset from said laser, said photodetector including a plurality of linearly positioned photodiodes, and
  (iv) imaging optics associated with said photodetector,
  (v) said photodetector having a field of view laterally across said roadway surface in relation to said direction of travel of said vehicle,
  (vi) wherein said beam from said laser is projected in a first plane and said field of view of said photodetector is in a second plane angularly offset from said first plane in relation to said roadway surface; and
(c) a computer, said computer including software for carrying out the operations of processing signals received from photodiodes in parallel and determining the length of said vehicle passing through the field of view of said photodetector based on absence of reflection of said beam of light from said roadway surface.

23. An apparatus as recited in claim 22, wherein said imaging optics associated with each said laser detector comprises:
(a) an image lens positioned between said corresponding photodetector and said roadway surface; and
(b) a telescopic lens positioned between said corresponding image lens and said roadway surface.

24. An apparatus as recited in claim 23, wherein said imaging optics associated with each said laser detector further comprises an optical filter positioned between said corresponding image lens and said corresponding telescopic lens.

* * * * *